US007818677B2

(12) United States Patent
Ruthfield et al.

(10) Patent No.: US 7,818,677 B2
(45) Date of Patent: *Oct. 19, 2010

(54) SINGLE WINDOW NAVIGATION METHODS AND SYSTEMS

(75) Inventors: Scott L. Ruthfield, Seattle, WA (US);
Richard J. Wolf, Seattle, WA (US);
Michael J. Hopcroft, Kirkland, WA (US); Paul R. Erickson, Sammamish, WA (US); Satoshi Nakajima, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 880 days.

This patent is subject to a terminal disclaimer.

(21) Appl. No.: 10/916,692

(22) Filed: Aug. 12, 2004

(65) Prior Publication Data

US 2005/0010871 A1 Jan. 13, 2005

Related U.S. Application Data

(63) Continuation of application No. 09/599,298, filed on Jun. 21, 2000, now Pat. No. 7,346,848.

(51) Int. Cl.
*G06F 3/00* (2006.01)
*G06F 15/16* (2006.01)
(52) U.S. Cl. ...................... 715/749; 715/802
(58) Field of Classification Search ............ 715/760, 715/748, 749, 854, 802, 804, 805, 806, 807, 715/745, 747, 765, 771, 762–763, 752, 758, 715/840–841
See application file for complete search history.

(56) References Cited

U.S. PATENT DOCUMENTS 4,201,978 A 5/1980 Nally
(Continued)

FOREIGN PATENT DOCUMENTS

EP 0841615 5/1998
(Continued)

OTHER PUBLICATIONS

"Microsoft Word 2000 Screenshots", (2000),11-17.
(Continued)

*Primary Examiner*—Steven P Sax

(57) ABSTRACT

A user interface (UI) in the form of a single navigable window enables a user to navigate to and between multiple different functionalities that are provided by a single application program. Novel use is made of a navigation model that manages the user's navigation activities to and between the different functionalities. Navigation instrumentalities enable the user to navigate among the different functionalities and include links to each of the different functionalities as well as browser-like navigation buttons. Context-sensitive command sets can also be provided along with the single navigable window. The context sensitive command sets include commands that automatically change as the user's computing context changes, e.g. as the user moves from functionality to functionality. The single application can be defined as a software platform that is extensible to receive and incorporate different functionalities. The functionalities can be provided as software modules that can be sent over a network such as the Internet. The extensible software platform provides a basis to offer a subscriber or fee-based service where different subscribers can, for a fee, access different functionalities via a network such as the Internet.

13 Claims, 10 Drawing Sheets

U.S. PATENT DOCUMENTS

| | | |
|---|---|---|
| 4,498,147 A | 2/1985 | Agnew et al. |
| 4,514,800 A | 4/1985 | Gruner et al. |
| 4,564,752 A | 1/1986 | Lepic et al. |
| 4,641,274 A | 2/1987 | Swank |
| 4,674,040 A | 6/1987 | Barker et al. |
| 4,723,211 A | 2/1988 | Barker et al. |
| 4,739,477 A | 4/1988 | Barker et al. |
| 4,815,029 A | 3/1989 | Barker et al. |
| 4,847,749 A | 7/1989 | Collins et al. |
| 4,910,663 A | 3/1990 | Bailey |
| 4,926,476 A | 5/1990 | Covey |
| 4,933,880 A | 6/1990 | Borgendale et al. |
| 4,962,475 A | 10/1990 | Hernandez et al. |
| 5,025,484 A | 6/1991 | Yamanari et al. |
| 5,072,412 A | 12/1991 | Henderson, Jr. et al. |
| 5,140,563 A | 8/1992 | Thinesen |
| 5,179,703 A | 1/1993 | Evans |
| 5,182,709 A | 1/1993 | Makus |
| 5,187,786 A | 2/1993 | Densmore et al. |
| 5,191,645 A | 3/1993 | Carlucci et al. |
| 5,195,183 A | 3/1993 | Miller et al. |
| 5,204,947 A | 4/1993 | Bernstein et al. |
| 5,206,951 A | 4/1993 | Khoyi et al. |
| 5,218,672 A | 6/1993 | Morgan et al. |
| 5,220,649 A | 6/1993 | Forcier |
| 5,222,160 A | 6/1993 | Sakai et al. |
| 5,228,100 A | 7/1993 | Takeda et al. |
| 5,237,680 A | 8/1993 | Adams et al. |
| 5,249,275 A | 9/1993 | Srivastava |
| 5,251,273 A | 10/1993 | Betts et al. |
| 5,274,803 A | 12/1993 | Dubin et al. |
| 5,297,249 A | 3/1994 | Bernstein et al. |
| 5,297,283 A | 3/1994 | Kelly, Jr. et al. |
| 5,313,631 A | 5/1994 | Kao |
| 5,313,646 A | 5/1994 | Hendricks et al. |
| 5,317,686 A | 5/1994 | Salas et al. |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,766 A | 11/1994 | Nakano et al. |
| 5,369,778 A | 11/1994 | San Soucie et al. |
| 5,371,675 A | 12/1994 | Greif et al. |
| 5,377,323 A | 12/1994 | Vasudevan |
| 5,379,419 A | 1/1995 | Heffernan et al. |
| 5,381,547 A | 1/1995 | Flug et al. |
| 5,390,325 A | 2/1995 | Miller |
| 5,396,623 A | 3/1995 | McCall et al. |
| 5,408,665 A | 4/1995 | Fitzgerald |
| 5,410,646 A | 4/1995 | Tondevold et al. |
| 5,410,688 A | 4/1995 | Williams et al. |
| 5,412,772 A | 5/1995 | Monson |
| 5,434,975 A | 7/1995 | Allen |
| 5,436,637 A | 7/1995 | Gayraud et al. |
| 5,438,659 A | 8/1995 | Notess et al. |
| 5,440,744 A | 8/1995 | Jacobson et al. |
| 5,446,842 A | 8/1995 | Schaeffer et al. |
| 5,455,875 A | 10/1995 | Chevion et al. |
| 5,459,865 A | 10/1995 | Heninger et al. |
| 5,481,722 A | 1/1996 | Skinner |
| 5,497,489 A | 3/1996 | Menne |
| 5,504,898 A | 4/1996 | Klein |
| 5,517,655 A | 5/1996 | Collins et al. |
| 5,535,389 A | 7/1996 | Elder et al. |
| 5,542,070 A | 7/1996 | LeBlanc et al. |
| 5,550,976 A | 8/1996 | Henderson et al. |
| 5,551,035 A | 8/1996 | Arnold et al. |
| 5,555,325 A | 9/1996 | Burger |
| 5,566,330 A | 10/1996 | Sheffield |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,600,789 A | 2/1997 | Parker et al. |
| 5,602,996 A | 2/1997 | Powers, III et al. |
| 5,608,720 A | 3/1997 | Biegel et al. |
| 5,625,783 A | 4/1997 | Ezekiel et al. |
| 5,627,979 A | 5/1997 | Chang et al. |
| 5,630,126 A | 5/1997 | Redpath |
| 5,634,121 A | 5/1997 | Tracz et al. |
| 5,634,124 A | 5/1997 | Khoyi et al. |
| 5,640,544 A | 6/1997 | Onodera et al. |
| 5,644,738 A | 7/1997 | Goldman et al. |
| 5,649,099 A | 7/1997 | Theimer et al. |
| 5,659,729 A | 8/1997 | Nielsen |
| 5,664,133 A | 9/1997 | Malamud et al. |
| 5,664,178 A | 9/1997 | Sinofsky |
| 5,668,966 A | 9/1997 | Ono et al. |
| 5,669,005 A | 9/1997 | Curbow et al. |
| 5,682,536 A | 10/1997 | Atkinson et al. |
| 5,689,667 A | 11/1997 | Kurtenbach |
| 5,689,703 A | 11/1997 | Atkinson et al. |
| 5,704,029 A | 12/1997 | Wright, Jr. |
| 5,706,501 A | 1/1998 | Horikiri et al. |
| 5,717,939 A | 2/1998 | Bricklin et al. |
| 5,721,824 A | 2/1998 | Taylor |
| 5,740,439 A | 4/1998 | Atkinson et al. |
| 5,742,504 A | 4/1998 | Meyer et al. |
| 5,745,683 A | 4/1998 | Lee et al. |
| 5,745,712 A | 4/1998 | Turpin et al. |
| 5,748,807 A | 5/1998 | Lopresti et al. |
| 5,758,184 A | 5/1998 | Lucovsky et al. |
| 5,758,358 A | 5/1998 | Ebbo |
| 5,761,408 A | 6/1998 | Kolawa et al. |
| 5,761,683 A | 6/1998 | Logan et al. |
| 5,764,984 A | 6/1998 | Loucks |
| 5,764,985 A | 6/1998 | Smale |
| 5,778,372 A | 7/1998 | Cordell et al. |
| 5,778,402 A | 7/1998 | Gipson |
| 5,784,555 A | 7/1998 | Stone |
| 5,790,796 A | 8/1998 | Sadowsky |
| 5,798,757 A | 8/1998 | Smith |
| 5,801,701 A | 9/1998 | Koppolu et al. |
| 5,802,304 A | 9/1998 | Stone |
| 5,806,079 A | 9/1998 | Rivette et al. |
| 5,815,830 A | 9/1998 | Anthony |
| 5,826,031 A | 10/1998 | Nielsen |
| 5,826,265 A | 10/1998 | Van Huben et al. |
| 5,835,777 A | 11/1998 | Staelin |
| 5,838,906 A | 11/1998 | Doyle et al. |
| 5,842,018 A | 11/1998 | Atkinson et al. |
| 5,845,077 A | 12/1998 | Fawcett |
| 5,845,090 A | 12/1998 | Collins, III et al. |
| 5,845,122 A | 12/1998 | Nielsen et al. |
| 5,854,630 A | 12/1998 | Nielsen |
| 5,859,973 A | 1/1999 | Carpenter et al. |
| 5,862,372 A | 1/1999 | Morris et al. |
| 5,862,379 A | 1/1999 | Rubin et al. |
| 5,864,819 A | 1/1999 | De Armas et al. |
| 5,873,088 A | 2/1999 | Hayashi et al. |
| 5,905,492 A | 5/1999 | Straub et al. |
| 5,907,621 A | 5/1999 | Bachman et al. |
| 5,907,704 A | 5/1999 | Gudmundson et al. |
| 5,910,895 A | 6/1999 | Proskauer et al. |
| 5,911,776 A | 6/1999 | Guck |
| 5,915,112 A | 6/1999 | Boutcher |
| 5,919,247 A | 7/1999 | Van Hoff et al. |
| 5,922,072 A | 7/1999 | Hutchinson et al. |
| 5,928,363 A | 7/1999 | Ruvolo |
| 5,929,858 A | 7/1999 | Shibata et al. |
| 5,940,075 A | 8/1999 | Mutschler, III et al. |
| 5,950,010 A | 9/1999 | Hesse et al. |
| 5,953,731 A | 9/1999 | Glaser |

| | | |
|---|---|---|
| 5,956,481 A | 9/1999 | Walsh et al. |
| 5,960,199 A | 9/1999 | Brodsky et al. |
| 5,963,964 A | 10/1999 | Nielsen |
| 5,973,696 A | 10/1999 | Agranat et al. |
| 5,974,454 A | 10/1999 | Apfel et al. |
| 5,982,370 A | 11/1999 | Kamper |
| 5,983,348 A | 11/1999 | Ji |
| 5,987,480 A | 11/1999 | Donohue et al. |
| 5,991,710 A | 11/1999 | Papineni et al. |
| 5,991,731 A | 11/1999 | Colon et al. |
| 5,991,877 A | 11/1999 | Luckenbaugh |
| 5,995,103 A | 11/1999 | Ashe |
| 5,999,740 A | 12/1999 | Rowley |
| 6,005,570 A | 12/1999 | Gayraud et al. |
| 6,006,227 A | 12/1999 | Freeman et al. |
| 6,012,066 A | 1/2000 | Discount et al. |
| 6,014,135 A | 1/2000 | Fernandes |
| 6,016,520 A | 1/2000 | Facq et al. |
| 6,018,743 A | 1/2000 | Xu |
| 6,021,403 A | 2/2000 | Horvitz et al. |
| 6,026,379 A | 2/2000 | Haller et al. |
| 6,026,416 A | 2/2000 | Kanerva et al. |
| 6,031,989 A | 2/2000 | Cordell |
| 6,035,297 A | 3/2000 | Van Huben et al. |
| 6,035,309 A | 3/2000 | Dauerer et al. |
| 6,044,205 A | 3/2000 | Reed et al. |
| 6,052,531 A | 4/2000 | Waldin et al. |
| 6,052,710 A | 4/2000 | Saliba et al. |
| 6,054,987 A | 4/2000 | Richardson |
| 6,057,837 A | 5/2000 | Hatakeda et al. |
| 6,058,413 A | 5/2000 | Flores et al. |
| 6,065,043 A | 5/2000 | Domenikos et al. |
| 6,069,626 A | 5/2000 | Cline et al. |
| 6,070,184 A | 5/2000 | Blount et al. |
| 6,072,870 A | 6/2000 | Nguyen et al. |
| 6,078,326 A | 6/2000 | Kilmer et al. |
| 6,078,327 A | 6/2000 | Liman et al. |
| 6,078,924 A | 6/2000 | Ainsbury et al. |
| 6,081,610 A | 6/2000 | Dwork et al. |
| 6,084,585 A | 7/2000 | Kraft et al. |
| 6,088,679 A | 7/2000 | Barkley |
| 6,088,708 A | 7/2000 | Burch et al. |
| 6,091,417 A | 7/2000 | Lefkowitz |
| 6,094,657 A | 7/2000 | Hailpern et al. |
| 6,096,096 A | 8/2000 | Murphy et al. |
| 6,097,382 A | 8/2000 | Rosen et al. |
| 6,098,081 A | 8/2000 | Heidorn et al. |
| 6,105,012 A | 8/2000 | Chang et al. |
| 6,108,637 A | 8/2000 | Blumenau |
| 6,108,783 A | 8/2000 | Krawczyk et al. |
| 6,115,646 A | 9/2000 | Fiszman et al. |
| 6,121,965 A | 9/2000 | Kenney et al. |
| 6,122,647 A | 9/2000 | Horowitz et al. |
| 6,144,969 A | 11/2000 | Inokuchi et al. |
| 6,151,624 A | 11/2000 | Teare et al. |
| 6,154,128 A | 11/2000 | Wookey et al. |
| 6,163,772 A | 12/2000 | Kramer et al. |
| 6,167,521 A | 12/2000 | Smith et al. |
| 6,167,523 A | 12/2000 | Strong |
| 6,182,094 B1 | 1/2001 | Humpleman et al. |
| 6,182,095 B1 | 1/2001 | Leymaster et al. |
| 6,188,401 B1 | 2/2001 | Peyer |
| 6,191,797 B1 | 2/2001 | Politis |
| 6,192,367 B1 | 2/2001 | Hawley et al. |
| 6,195,661 B1 | 2/2001 | Filepp et al. |
| 6,199,204 B1 | 3/2001 | Donohue |
| 6,209,128 B1 | 3/2001 | Gerard et al. |
| 6,216,152 B1 | 4/2001 | Wong et al. |
| 6,219,423 B1 | 4/2001 | Davis |
| 6,219,698 B1 | 4/2001 | Iannucci et al. |
| 6,225,996 B1 | 5/2001 | Gibb et al. |
| 6,235,027 B1 | 5/2001 | Herzon |
| 6,243,088 B1 | 6/2001 | McCormack et al. |
| 6,253,366 B1 | 6/2001 | Mutschler, III |
| 6,253,374 B1 | 6/2001 | Dresevic et al. |
| 6,263,313 B1 | 7/2001 | Milsted et al. |
| 6,266,810 B1 | 7/2001 | Tanaka et al. |
| 6,268,852 B1 | 7/2001 | Lindhorst et al. |
| 6,272,506 B1 | 8/2001 | Bell |
| 6,275,227 B1 | 8/2001 | DeStefano |
| 6,275,599 B1 | 8/2001 | Adler et al. |
| 6,279,042 B1 | 8/2001 | Ouchi |
| 6,281,896 B1 | 8/2001 | Alimpich et al. |
| 6,282,709 B1 | 8/2001 | Reha et al. |
| 6,282,711 B1 | 8/2001 | Halpern et al. |
| 6,286,033 B1 | 9/2001 | Kishinsky et al. |
| 6,292,897 B1 | 9/2001 | Gennaro et al. |
| 6,297,819 B1 | 10/2001 | Furst |
| 6,300,948 B1 | 10/2001 | Geller et al. |
| 6,307,955 B1 | 10/2001 | Zank et al. |
| 6,308,179 B1 | 10/2001 | Petersen et al. |
| 6,308,273 B1 | 10/2001 | Goertzel et al. |
| 6,311,221 B1 | 10/2001 | Raz et al. |
| 6,311,271 B1 | 10/2001 | Gennaro et al. |
| 6,314,415 B1 | 11/2001 | Mukherjee |
| 6,321,259 B1 | 11/2001 | Ouellette et al. |
| 6,321,334 B1 | 11/2001 | Jerger et al. |
| 6,327,628 B1 | 12/2001 | Anuff et al. |
| 6,331,864 B1 | 12/2001 | Coco et al. |
| 6,336,214 B1 | 1/2002 | Sundaresan |
| 6,342,907 B1 | 1/2002 | Petty et al. |
| 6,343,149 B1 | 1/2002 | Motoiwa |
| 6,343,302 B1 | 1/2002 | Graham |
| 6,343,377 B1 | 1/2002 | Gessner et al. |
| 6,344,862 B1 | 2/2002 | Williams et al. |
| 6,345,256 B1 | 2/2002 | Milsted et al. |
| 6,345,278 B1 | 2/2002 | Hitchcock et al. |
| 6,345,361 B1 | 2/2002 | Jerger et al. |
| 6,347,323 B1 | 2/2002 | Garber et al. |
| 6,349,408 B1 | 2/2002 | Smith |
| 6,351,574 B1 | 2/2002 | Yair et al. |
| 6,353,851 B1 | 3/2002 | Anupam et al. |
| 6,353,926 B1 | 3/2002 | Parthesarathy et al. |
| 6,356,906 B1 | 3/2002 | Lippert et al. |
| 6,357,038 B1 | 3/2002 | Scouten |
| 6,366,907 B1 | 4/2002 | Fanning et al. |
| 6,366,912 B1 | 4/2002 | Wallent et al. |
| 6,367,013 B1 | 4/2002 | Bisbee et al. |
| 6,369,840 B1 | 4/2002 | Barnett et al. |
| 6,369,841 B1 | 4/2002 | Salomon et al. |
| 6,374,402 B1 | 4/2002 | Schmeidler et al. |
| 6,381,742 B2 | 4/2002 | Forbes et al. |
| 6,381,743 B1 | 4/2002 | Mutschler, III |
| 6,389,434 B1 | 5/2002 | Rivette et al. |
| 6,393,456 B1 | 5/2002 | Ambler et al. |
| 6,393,469 B1 | 5/2002 | Dozier et al. |
| 6,396,488 B1 | 5/2002 | Simmons et al. |
| 6,397,264 B1 | 5/2002 | Stasnick et al. |
| 6,405,221 B1 | 6/2002 | Levine et al. |
| 6,405,238 B1 | 6/2002 | Votipka |
| 6,408,311 B1 | 6/2002 | Baisley et al. |
| 6,414,700 B1 | 7/2002 | Kurtenbach et al. |
| 6,421,070 B1 | 7/2002 | Ramos et al. |
| 6,421,656 B1 | 7/2002 | Cheng et al. |
| 6,425,125 B1 | 7/2002 | Fries et al. |
| 6,429,885 B1 | 8/2002 | Saib et al. |
| 6,434,563 B1 | 8/2002 | Pasquali et al. |
| 6,434,564 B2 | 8/2002 | Ebert |
| 6,442,563 B1 | 8/2002 | Bacon et al. |
| 6,442,755 B1 | 8/2002 | Lemmons et al. |
| 6,446,110 B1 | 9/2002 | Lection et al. |
| 6,449,617 B1 | 9/2002 | Quinn et al. |
| 6,457,009 B1 | 9/2002 | Bollay |
| 6,460,058 B2 | 10/2002 | Koppolu et al. |
| 6,463,419 B1 | 10/2002 | Kluss |
| 6,470,349 B1 | 10/2002 | Heninger et al. |

| | | |
|---|---|---|
| 6,473,800 B1 | 10/2002 | Jerger et al. |
| 6,476,828 B1 | 11/2002 | Burkett et al. |
| 6,476,833 B1 | 11/2002 | Moshfeghi |
| 6,477,544 B1 | 11/2002 | Bolosky et al. |
| 6,480,860 B1 | 11/2002 | Monday |
| 6,487,566 B1 | 11/2002 | Sundaresan |
| 6,490,601 B1 | 12/2002 | Markus et al. |
| 6,493,007 B1 | 12/2002 | Pang |
| 6,493,702 B1 | 12/2002 | Adar et al. |
| 6,501,864 B1 | 12/2002 | Eguchi et al. |
| 6,502,101 B1 | 12/2002 | Verprauskus et al. |
| 6,502,103 B1 | 12/2002 | Frey et al. |
| 6,505,200 B1 | 1/2003 | Ims et al. |
| 6,505,230 B1 | 1/2003 | Mohan et al. |
| 6,505,300 B2 | 1/2003 | Chen et al. |
| 6,507,856 B1 | 1/2003 | Chen et al. |
| 6,516,322 B1 | 2/2003 | Meredith |
| 6,519,617 B1 | 2/2003 | Wanderski et al. |
| 6,523,027 B1 | 2/2003 | Underwood |
| 6,529,909 B1 | 3/2003 | Bowman-Amuah |
| 6,535,229 B1 | 3/2003 | Kraft |
| 6,535,883 B1 | 3/2003 | Lee et al. |
| RE38,070 E | 4/2003 | Spies et al. |
| 6,546,546 B1 | 4/2003 | Van Doorn |
| 6,546,554 B1 | 4/2003 | Schmidt et al. |
| 6,549,221 B1 | 4/2003 | Brown et al. |
| 6,549,878 B1 | 4/2003 | Lowry et al. |
| 6,549,922 B1 | 4/2003 | Srivastava et al. |
| 6,553,402 B1 | 4/2003 | Makarios et al. |
| 6,560,616 B1 | 5/2003 | Garber |
| 6,560,620 B1 | 5/2003 | Ching |
| 6,560,640 B2 | 5/2003 | Smethers |
| 6,563,514 B1 | 5/2003 | Samar |
| 6,571,253 B1 | 5/2003 | Thompson et al. |
| 6,578,144 B1 | 6/2003 | Gennaro et al. |
| 6,581,061 B2 | 6/2003 | Graham |
| 6,584,469 B1 | 6/2003 | Chiang et al. |
| 6,584,548 B1 | 6/2003 | Bourne et al. |
| 6,585,778 B1 | 7/2003 | Hind et al. |
| 6,589,290 B1 | 7/2003 | Maxwell et al. |
| 6,594,686 B1 | 7/2003 | Edwards et al. |
| 6,598,219 B1 | 7/2003 | Lau |
| 6,603,489 B1 | 8/2003 | Edlund et al. |
| 6,604,099 B1 | 8/2003 | Chung et al. |
| 6,606,606 B2 | 8/2003 | Starr |
| 6,609,200 B2 | 8/2003 | Anderson et al. |
| 6,611,822 B1 | 8/2003 | Beams et al. |
| 6,611,840 B1 | 8/2003 | Baer et al. |
| 6,611,843 B1 | 8/2003 | Jacobs |
| 6,613,098 B1 | 9/2003 | Sorge et al. |
| 6,615,276 B1 | 9/2003 | Mastrianni et al. |
| 6,629,109 B1 | 9/2003 | Koshisaka |
| 6,631,357 B1 | 10/2003 | Perkowski |
| 6,631,379 B2 | 10/2003 | Cox |
| 6,631,497 B1 | 10/2003 | Jamshidi et al. |
| 6,631,519 B1 | 10/2003 | Nicholson et al. |
| 6,632,251 B1 | 10/2003 | Rutten et al. |
| 6,633,315 B1 | 10/2003 | Sobeski et al. |
| 6,635,089 B1 | 10/2003 | Burkett et al. |
| 6,636,845 B2 | 10/2003 | Chau et al. |
| 6,643,633 B2 | 11/2003 | Chau et al. |
| 6,643,652 B2 | 11/2003 | Helgeson et al. |
| 6,643,684 B1 | 11/2003 | Malkin et al. |
| 6,651,217 B1 | 11/2003 | Kennedy et al. |
| 6,654,737 B1 | 11/2003 | Nunez |
| 6,654,932 B1 | 11/2003 | Bahrs et al. |
| 6,658,417 B1 | 12/2003 | Stakutis et al. |
| 6,658,622 B1 | 12/2003 | Aiken et al. |
| 6,661,920 B1 | 12/2003 | Skinner |
| 6,668,369 B1 | 12/2003 | Krebs et al. |
| 6,671,805 B1 | 12/2003 | Brown et al. |
| 6,675,202 B1 | 1/2004 | Perttunen |
| 6,678,717 B1 | 1/2004 | Schneider |
| 6,681,370 B2 | 1/2004 | Lawrence et al. |
| 6,691,230 B1 | 2/2004 | Bardon |
| 6,691,281 B1 | 2/2004 | Sorge et al. |
| 6,697,944 B1 | 2/2004 | Jones et al. |
| 6,701,434 B1 | 3/2004 | Rohatgi |
| 6,701,486 B1 | 3/2004 | Weber et al. |
| 6,704,906 B1 | 3/2004 | Yankovich et al. |
| 6,711,679 B1 | 3/2004 | Guski et al. |
| 6,720,985 B1 | 4/2004 | Lapstun et al. |
| 6,725,426 B1 | 4/2004 | Pavlov |
| 6,728,755 B1 | 4/2004 | de Ment |
| 6,735,721 B1 | 5/2004 | Morrow et al. |
| 6,745,367 B1 | 6/2004 | Bates et al. |
| 6,748,385 B1 | 6/2004 | Rodkin et al. |
| 6,748,569 B1 | 6/2004 | Brooke et al. |
| 6,751,777 B2 | 6/2004 | Bates et al. |
| 6,754,874 B1 | 6/2004 | Richman |
| 6,757,826 B1 | 6/2004 | Paltenghe |
| 6,757,868 B1 | 6/2004 | Glaser et al. |
| 6,760,723 B2 | 7/2004 | Oshinsky et al. |
| 6,763,343 B1 | 7/2004 | Brooke et al. |
| 6,772,139 B1 | 8/2004 | Smith, III |
| 6,772,165 B2 | 8/2004 | O'Carroll |
| 6,774,926 B1 | 8/2004 | Ellis et al. |
| 6,779,154 B1 | 8/2004 | Nussbaum et al. |
| 6,781,609 B1 | 8/2004 | Barker et al. |
| 6,782,144 B2 | 8/2004 | Bellavita et al. |
| 6,799,299 B1 | 9/2004 | Li et al. |
| 6,801,929 B1 | 10/2004 | Donoho et al. |
| 6,816,849 B1 | 11/2004 | Halt, Jr. |
| 6,828,992 B1 | 12/2004 | Freeman et al. |
| 6,845,380 B2 | 1/2005 | Su et al. |
| 6,845,499 B2 | 1/2005 | Srivastava et al. |
| 6,847,387 B2 | 1/2005 | Roth |
| 6,848,078 B1 | 1/2005 | Birsan et al. |
| 6,850,895 B2 | 2/2005 | Brodersen et al. |
| 6,862,689 B2 | 3/2005 | Bergsten et al. |
| 6,871,220 B1 | 3/2005 | Rajan et al. |
| 6,871,345 B1 | 3/2005 | Crow et al. |
| 6,874,130 B1 | 3/2005 | Baweja et al. |
| 6,876,996 B2 | 4/2005 | Czajkowski et al. |
| 6,883,168 B1 | 4/2005 | James et al. |
| 6,889,359 B1 | 5/2005 | Conner et al. |
| 6,901,403 B1 | 5/2005 | Bata et al. |
| 6,915,454 B1 | 7/2005 | Moore et al. |
| 6,925,609 B1 | 8/2005 | Lucke |
| 6,931,532 B1 | 8/2005 | Davis et al. |
| 6,941,510 B1 | 9/2005 | Ozzie et al. |
| 6,941,511 B1 | 9/2005 | Hind et al. |
| 6,941,521 B2 | 9/2005 | Lin et al. |
| 6,948,129 B1 | 9/2005 | Loghmani |
| 6,948,133 B2 | 9/2005 | Haley |
| 6,948,135 B1 | 9/2005 | Ruthfield et al. |
| 6,950,980 B1 | 9/2005 | Malcolm |
| 6,950,987 B1 | 9/2005 | Hargraves et al. |
| 6,957,395 B1 | 10/2005 | Jobs et al. |
| 6,961,897 B1 | 11/2005 | Peel, Jr. et al. |
| 6,963,875 B2 | 11/2005 | Moore et al. |
| 6,968,503 B1 | 11/2005 | Chang et al. |
| 6,968,505 B2 | 11/2005 | Stoll et al. |
| 6,993,714 B2 | 1/2006 | Kaler et al. |
| 6,993,722 B1 | 1/2006 | Greer et al. |
| 6,996,776 B1 | 2/2006 | Makely et al. |
| 6,996,781 B1 | 2/2006 | Myers et al. |
| 7,000,179 B2 | 2/2006 | Yankovich et al. |
| 7,002,560 B2 | 2/2006 | Graham |
| 7,003,548 B1 | 2/2006 | Barck et al. |
| 7,003,722 B2 | 2/2006 | Rothchiller et al. |
| 7,010,580 B1 | 3/2006 | Fu et al. |
| 7,020,869 B2 | 3/2006 | Abrari et al. |
| 7,024,417 B1 | 4/2006 | Russakovsky et al. |
| 7,032,170 B2 | 4/2006 | Poulose et al. |
| 7,036,072 B1 | 4/2006 | Sulistio et al. |

| | | | | | |
|---|---|---|---|---|---|
| 7,039,875 B2 | 5/2006 | Khalfay et al. | 7,725,834 B2 | 5/2010 | Bell |
| 7,043,687 B2 | 5/2006 | Knauss et al. | 7,743,063 B2 | 6/2010 | James et al. |
| 7,051,273 B1 | 5/2006 | Holt et al. | 2001/0003828 A1 | 6/2001 | Peterson et al. |
| 7,058,663 B2 | 6/2006 | Johnston et al. | 2001/0007109 A1 | 7/2001 | Lange |
| 7,062,764 B2 | 6/2006 | Cohen et al. | 2001/0016880 A1 | 8/2001 | Cai et al. |
| 7,065,493 B1 | 6/2006 | Homsi | 2001/0022592 A1 | 9/2001 | Alimpich et al. |
| 7,076,728 B2 | 7/2006 | Davis et al. | 2001/0024195 A1 | 9/2001 | Hayakawa |
| 7,080,083 B2 | 7/2006 | Kim et al. | 2001/0037345 A1 | 11/2001 | Kiernan |
| 7,080,325 B2 | 7/2006 | Treibach-Heck et al. | 2001/0044850 A1 | 11/2001 | Raz et al. |
| 7,081,882 B2 | 7/2006 | Sowden et al. | 2001/0051928 A1 | 12/2001 | Brody |
| 7,086,009 B2 | 8/2006 | Resnick et al. | 2001/0054004 A1 | 12/2001 | Powers |
| 7,086,042 B2 | 8/2006 | Abe et al. | 2001/0056411 A1 | 12/2001 | Lindskog et al. |
| 7,088,374 B2 | 8/2006 | David et al. | 2001/0056429 A1 | 12/2001 | Moore et al. |
| 7,100,147 B2 | 8/2006 | Miller et al. | 2001/0056460 A1 | 12/2001 | Sahota |
| 7,103,611 B2 | 9/2006 | Murthy et al. | 2002/0010700 A1 | 1/2002 | Wotring et al. |
| 7,106,888 B1 | 9/2006 | Silverbrook et al. | 2002/0010743 A1 | 1/2002 | Ryan et al. |
| 7,107,282 B1 | 9/2006 | Yalamanchi | 2002/0010746 A1 | 1/2002 | Jilk et al. |
| 7,107,521 B2 | 9/2006 | Santos | 2002/0010855 A1 | 1/2002 | Reshef et al. |
| 7,120,863 B1 | 10/2006 | Wang | 2002/0013788 A1 | 1/2002 | Pennell et al. |
| 7,124,167 B1 | 10/2006 | Bellotti et al. | 2002/0019941 A1 | 2/2002 | Chan et al. |
| 7,130,885 B2 | 10/2006 | Chandra et al. | 2002/0023113 A1 | 2/2002 | Hsing et al. |
| 7,143,341 B1 | 11/2006 | Kohli | 2002/0026441 A1 | 2/2002 | Kutay et al. |
| 7,146,564 B2 | 12/2006 | Kim et al. | 2002/0026461 A1 | 2/2002 | Kutay et al. |
| 7,152,205 B2 | 12/2006 | Day et al. | 2002/0032590 A1 | 3/2002 | Anand et al. |
| 7,159,011 B1 | 1/2007 | Knight et al. | 2002/0032692 A1 | 3/2002 | Suzuki et al. |
| 7,168,035 B1 | 1/2007 | Bell et al. | 2002/0032706 A1 | 3/2002 | Perla et al. |
| 7,178,166 B1 | 2/2007 | Taylor et al. | 2002/0032768 A1 | 3/2002 | Voskuil |
| 7,190,376 B2 | 3/2007 | Tonisson | 2002/0035579 A1 | 3/2002 | Wang et al. |
| 7,191,394 B1 * | 3/2007 | Ardeleanu et al. .......... 715/241 | 2002/0035581 A1 | 3/2002 | Reynar et al. |
| 7,200,665 B2 | 4/2007 | Eshghi et al. | 2002/0040469 A1 | 4/2002 | Pramberger |
| 7,200,816 B2 | 4/2007 | Falk et al. | 2002/0052769 A1 | 5/2002 | Navani et al. |
| 7,213,200 B2 | 5/2007 | Abe et al. | 2002/0053021 A1 | 5/2002 | Rice et al. |
| 7,236,982 B2 | 6/2007 | Zlatanov et al. | 2002/0054126 A1 * | 5/2002 | Gamon ...................... 345/781 |
| 7,237,114 B1 | 6/2007 | Rosenberg | 2002/0054128 A1 | 5/2002 | Lau et al. |
| 7,249,328 B1 | 7/2007 | Davis | 2002/0057297 A1 | 5/2002 | Grimes et al. |
| 7,272,789 B2 | 9/2007 | O'Brien | 2002/0065798 A1 | 5/2002 | Bostleman et al. |
| 7,281,018 B1 | 10/2007 | Begun et al. | 2002/0065847 A1 | 5/2002 | Furukawa et al. |
| 7,281,206 B2 | 10/2007 | Schnelle et al. | 2002/0070973 A1 | 6/2002 | Croley |
| 7,281,245 B2 | 10/2007 | Reynar et al. | 2002/0078074 A1 | 6/2002 | Cho et al. |
| 7,284,208 B2 | 10/2007 | Matthews | 2002/0078103 A1 | 6/2002 | Gorman et al. |
| 7,287,218 B1 | 10/2007 | Knotz et al. | 2002/0083145 A1 | 6/2002 | Perinpanathan |
| 7,296,017 B2 | 11/2007 | Larcheveque et al. | 2002/0083148 A1 | 6/2002 | Shaw et al. |
| 7,313,758 B2 | 12/2007 | Kozlov | 2002/0083318 A1 | 6/2002 | Larose |
| 7,316,003 B1 | 1/2008 | Dulepet et al. | 2002/0091738 A1 | 7/2002 | Rohrabaugh et al. |
| 7,318,237 B2 | 1/2008 | Moriconi et al. | 2002/0099952 A1 | 7/2002 | Lambert et al. |
| 7,334,178 B1 | 2/2008 | Stanciu et al. | 2002/0100027 A1 | 7/2002 | Binding et al. |
| 7,337,391 B2 | 2/2008 | Clarke et al. | 2002/0107885 A1 | 8/2002 | Brooks et al. |
| 7,337,392 B2 | 2/2008 | Lue | 2002/0111699 A1 | 8/2002 | Melli et al. |
| 7,346,610 B2 | 3/2008 | Ruthfield et al. | 2002/0111932 A1 | 8/2002 | Roberge et al. |
| 7,346,840 B1 | 3/2008 | Ravishankar et al. | 2002/0112224 A1 | 8/2002 | Cox |
| 7,346,848 B1 | 3/2008 | Ruthfield et al. | 2002/0129056 A1 | 9/2002 | Conant et al. |
| 7,350,141 B2 | 3/2008 | Kotler et al. | 2002/0133484 A1 | 9/2002 | Chau et al. |
| 7,370,066 B1 | 5/2008 | Sikchi et al. | 2002/0152222 A1 | 10/2002 | Holbrook |
| 7,373,595 B2 | 5/2008 | Jones et al. | 2002/0152244 A1 | 10/2002 | Dean et al. |
| 7,376,673 B1 | 5/2008 | Chalecki et al. | 2002/0156772 A1 | 10/2002 | Chau et al. |
| 7,412,649 B2 | 8/2008 | Emek et al. | 2002/0156846 A1 | 10/2002 | Rawat et al. |
| 7,424,671 B2 | 9/2008 | Elza et al. | 2002/0156929 A1 | 10/2002 | Hekmatpour |
| 7,428,699 B1 | 9/2008 | Kane et al. | 2002/0169752 A1 | 11/2002 | Kusama et al. |
| 7,441,200 B2 | 10/2008 | Savage | 2002/0169789 A1 | 11/2002 | Kutay et al. |
| 7,490,109 B1 | 2/2009 | Sikchi et al. | 2002/0174147 A1 | 11/2002 | Wang et al. |
| 7,496,632 B2 | 2/2009 | Chapman et al. | 2002/0174417 A1 | 11/2002 | Sijacic et al. |
| 7,496,837 B1 | 2/2009 | Larcheveque et al. | 2002/0178187 A1 | 11/2002 | Rasmussen et al. |
| 7,543,228 B2 | 6/2009 | Kelkar | 2002/0178380 A1 | 11/2002 | Wolf et al. |
| 7,549,115 B2 | 6/2009 | Kotler | 2002/0184188 A1 | 12/2002 | Mandyam et al. |
| 7,584,417 B2 | 9/2009 | Friend et al. | 2002/0184219 A1 | 12/2002 | Preisig et al. |
| 7,613,996 B2 | 11/2009 | Dallett et al. | 2002/0184401 A1 | 12/2002 | Kadel, Jr. et al. |
| 7,673,227 B2 | 3/2010 | Kotler | 2002/0184485 A1 | 12/2002 | Dray, Jr. et al. |
| 7,673,228 B2 | 3/2010 | Kelkar | 2002/0188597 A1 | 12/2002 | Kern et al. |
| 7,676,843 B1 | 3/2010 | Stott | 2002/0188613 A1 | 12/2002 | Chakraborty et al. |
| 7,689,929 B2 | 3/2010 | Ruthfield | 2002/0194219 A1 | 12/2002 | Bradley et al. |
| 7,692,636 B2 | 4/2010 | Kim | 2002/0196281 A1 | 12/2002 | Audleman et al. |
| 7,712,022 B2 | 5/2010 | Smuga | 2002/0196288 A1 | 12/2002 | Emrani |
| 7,721,190 B2 | 5/2010 | Sikchi | 2002/0198891 A1 | 12/2002 | Li |

| | | | | | | |
|---|---|---|---|---|---|---|
| 2002/0198935 | A1 | 12/2002 | Crandall, Sr. et al. | 2003/0237047 A1 | 12/2003 | Borson |
| 2003/0004951 | A1 | 1/2003 | Chokshi | 2004/0002939 A1 | 1/2004 | Arora |
| 2003/0007000 | A1 | 1/2003 | Carlson et al. | 2004/0002950 A1 | 1/2004 | Brennan et al. |
| 2003/0014397 | A1 | 1/2003 | Chau et al. | 2004/0003031 A1 | 1/2004 | Brown et al. |
| 2003/0018668 | A1 | 1/2003 | Britton et al. | 2004/0003353 A1 | 1/2004 | Rivera et al. |
| 2003/0020746 | A1 | 1/2003 | Chen et al. | 2004/0003389 A1 | 1/2004 | Reynar et al. |
| 2003/0023641 | A1 | 1/2003 | Gorman et al. | 2004/0006744 A1 | 1/2004 | Jones et al. |
| 2003/0025693 | A1 | 2/2003 | Haley | 2004/0010752 A1 | 1/2004 | Chan et al. |
| 2003/0025732 | A1 | 2/2003 | Prichard | 2004/0015778 A1 | 1/2004 | Britton et al. |
| 2003/0026507 | A1 | 2/2003 | Zlotnick | 2004/0015783 A1 | 1/2004 | Lennon et al. |
| 2003/0028550 | A1 | 2/2003 | Lee et al. | 2004/0024842 A1 | 2/2004 | Witt |
| 2003/0033037 | A1 | 2/2003 | Yuen et al. | 2004/0030991 A1 | 2/2004 | Hepworth et al. |
| 2003/0037303 | A1 | 2/2003 | Bodlaender | 2004/0039881 A1 | 2/2004 | Shoebridge et al. |
| 2003/0038788 | A1 | 2/2003 | Demartines et al. | 2004/0039990 A1 | 2/2004 | Bakar et al. |
| 2003/0038846 | A1 | 2/2003 | Hori et al. | 2004/0039993 A1 | 2/2004 | Kougiouris et al. |
| 2003/0043986 | A1 | 3/2003 | Creamer | 2004/0044961 A1 | 3/2004 | Pesenson |
| 2003/0046665 | A1 | 3/2003 | Ilin | 2004/0044965 A1 | 3/2004 | Toyama et al. |
| 2003/0048301 | A1 | 3/2003 | Menninger | 2004/0046789 A1 | 3/2004 | Inanoria |
| 2003/0051243 | A1 | 3/2003 | Lemmons et al. | 2004/0054966 A1 | 3/2004 | Busch et al. |
| 2003/0055811 | A1 | 3/2003 | Stork et al. | 2004/0059754 A1 | 3/2004 | Barghout et al. |
| 2003/0055828 | A1 | 3/2003 | Koch et al. | 2004/0073565 A1 | 4/2004 | Kaufman et al. |
| 2003/0056198 | A1 | 3/2003 | Al-Azzawe | 2004/0073868 A1 | 4/2004 | Easter et al. |
| 2003/0061386 | A1 | 3/2003 | Brown | 2004/0078756 A1 | 4/2004 | Napper et al. |
| 2003/0061567 | A1 | 3/2003 | Brown et al. | 2004/0083426 A1 | 4/2004 | Sahu |
| 2003/0069881 | A1 | 4/2003 | Huttunen | 2004/0088647 A1 | 5/2004 | Miller et al. |
| 2003/0074279 | A1 | 4/2003 | Viswanath et al. | 2004/0088652 A1 | 5/2004 | Abe et al. |
| 2003/0084424 | A1 | 5/2003 | Reddy et al. | 2004/0093596 A1 | 5/2004 | Koyano |
| 2003/0093755 | A1 | 5/2003 | O'Carroll | 2004/0107367 A1 | 6/2004 | Kisters |
| 2003/0110443 | A1 | 6/2003 | Yankovich et al. | 2004/0117769 A1 | 6/2004 | Lauzon et al. |
| 2003/0120578 | A1 | 6/2003 | Newman | 2004/0123277 A1 | 6/2004 | Schrader et al. |
| 2003/0120651 | A1 | 6/2003 | Bernstein et al. | 2004/0139400 A1 | 7/2004 | Allam et al. |
| 2003/0120659 | A1 | 6/2003 | Sridhar | 2004/0146199 A1 | 7/2004 | Berkner et al. |
| 2003/0120671 | A1 | 6/2003 | Kim et al. | 2004/0148178 A1 | 7/2004 | Brain |
| 2003/0120686 | A1 | 6/2003 | Kim et al. | 2004/0148514 A1 | 7/2004 | Fee et al. |
| 2003/0126555 | A1 | 7/2003 | Aggarwal et al. | 2004/0148571 A1 | 7/2004 | Lue |
| 2003/0128196 | A1 | 7/2003 | Lapstun et al. | 2004/0162741 A1 | 8/2004 | Flaxer et al. |
| 2003/0135825 | A1 | 7/2003 | Gertner et al. | 2004/0163041 A1 | 8/2004 | Engel |
| 2003/0140132 | A1 | 7/2003 | Champagne et al. | 2004/0163046 A1 | 8/2004 | Chu et al. |
| 2003/0140160 | A1 | 7/2003 | Raz et al. | 2004/0172442 A1 | 9/2004 | Ripley |
| 2003/0142072 | A1 | 7/2003 | Lapstun et al. | 2004/0181543 A1 | 9/2004 | Wu et al. |
| 2003/0149934 | A1 | 8/2003 | Worden | 2004/0181711 A1 | 9/2004 | Johnson et al. |
| 2003/0158897 | A1 | 8/2003 | Ben-Natan et al. | 2004/0186762 A1 | 9/2004 | Beaven et al. |
| 2003/0163285 | A1 | 8/2003 | Nakamura et al. | 2004/0189708 A1 | 9/2004 | Larcheveque et al. |
| 2003/0167277 | A1 | 9/2003 | Hejlsberg et al. | 2004/0189716 A1 | 9/2004 | Paoli et al. |
| 2003/0172113 | A1 | 9/2003 | Cameron et al. | 2004/0194035 A1 | 9/2004 | Chakraborty |
| 2003/0182268 | A1 | 9/2003 | Lal | 2004/0199572 A1 | 10/2004 | Hunt et al. |
| 2003/0182327 | A1 | 9/2003 | Ramanujam et al. | 2004/0205473 A1 | 10/2004 | Fisher et al. |
| 2003/0187756 | A1 | 10/2003 | Klivington et al. | 2004/0205525 A1 | 10/2004 | Murren et al. |
| 2003/0187930 | A1 | 10/2003 | Ghaffar et al. | 2004/0205534 A1 | 10/2004 | Koelle |
| 2003/0188260 | A1 | 10/2003 | Jensen et al. | 2004/0205571 A1 | 10/2004 | Adler |
| 2003/0189593 | A1 | 10/2003 | Yarvin | 2004/0205592 A1 | 10/2004 | Huang |
| 2003/0192008 | A1 | 10/2003 | Lee | 2004/0205605 A1 | 10/2004 | Adler et al. |
| 2003/0200506 | A1 | 10/2003 | Abe et al. | 2004/0205644 A1 | 10/2004 | Shaughnessy et al. |
| 2003/0204481 | A1 | 10/2003 | Lau | 2004/0205653 A1 | 10/2004 | Hadfield et al. |
| 2003/0204511 | A1 | 10/2003 | Brundage | 2004/0205671 A1 | 10/2004 | Sukehiro et al. |
| 2003/0204814 | A1 | 10/2003 | Elo et al. | 2004/0210599 A1 | 10/2004 | Friedman et al. |
| 2003/0205615 | A1 | 11/2003 | Marappan | 2004/0210645 A1 | 10/2004 | Kouznetsov et al. |
| 2003/0210428 | A1 | 11/2003 | Bevlin et al. | 2004/0216084 A1 | 10/2004 | Brown et al. |
| 2003/0212664 | A1 | 11/2003 | Breining et al. | 2004/0221238 A1 | 11/2004 | Cifra et al. |
| 2003/0212902 | A1 | 11/2003 | van der Made | 2004/0221245 A1 | 11/2004 | Chickles et al. |
| 2003/0217053 | A1 | 11/2003 | Bachman et al. | 2004/0237030 A1 | 11/2004 | Malkin |
| 2003/0218620 | A1 | 11/2003 | Lai et al. | 2004/0260593 A1 | 12/2004 | Abraham-Fuchs et al. |
| 2003/0220930 | A1 | 11/2003 | Milleker et al. | 2004/0261019 A1 | 12/2004 | Imamura et al. |
| 2003/0225469 | A1 | 12/2003 | DeRemer et al. | 2004/0268229 A1 | 12/2004 | Paoli et al. |
| 2003/0225768 | A1 | 12/2003 | Chaudhuri | 2005/0004893 A1 | 1/2005 | Sangroniz |
| 2003/0225829 | A1 | 12/2003 | Pena et al. | 2005/0005248 A1 | 1/2005 | Rockey et al. |
| 2003/0226111 | A1 | 12/2003 | Wirts et al. | 2005/0015279 A1 | 1/2005 | Rucker |
| 2003/0226132 | A1 | 12/2003 | Tondreau et al. | 2005/0015732 A1 | 1/2005 | Vedula et al. |
| 2003/0233374 | A1 | 12/2003 | Spinola et al. | 2005/0022115 A1 | 1/2005 | Baumgartner et al. |
| 2003/0233644 | A1 | 12/2003 | Cohen et al. | 2005/0027757 A1 | 2/2005 | Kiessig et al. |
| 2003/0236859 | A1 | 12/2003 | Vaschillo et al. | 2005/0028073 A1 | 2/2005 | Henry et al. |
| 2003/0236903 | A1 | 12/2003 | Piotrowski | 2005/0033626 A1 | 2/2005 | Kruse et al. |
| 2003/0237046 | A1 | 12/2003 | Parker et al. | 2005/0033728 A1 | 2/2005 | James |

| | | |
|---|---|---|
| 2005/0038711 A1 | 2/2005 | Marlelo |
| 2005/0050066 A1 | 3/2005 | Hughes |
| 2005/0055627 A1 | 3/2005 | Lloyd et al. |
| 2005/0060324 A1 | 3/2005 | Johnson et al. |
| 2005/0060647 A1 | 3/2005 | Doan et al. |
| 2005/0060721 A1 | 3/2005 | Choudhary et al. |
| 2005/0065933 A1 | 3/2005 | Goering |
| 2005/0065936 A1 | 3/2005 | Goering |
| 2005/0066287 A1 | 3/2005 | Tattrie et al. |
| 2005/0071752 A1 | 3/2005 | Marlatt |
| 2005/0076022 A1 | 4/2005 | Wu et al. |
| 2005/0076049 A1 | 4/2005 | Qubti et al. |
| 2005/0080801 A1 | 4/2005 | Kothandaraman et al. |
| 2005/0091285 A1 | 4/2005 | Krishnan et al. |
| 2005/0091305 A1 | 4/2005 | Lange et al. |
| 2005/0097536 A1 | 5/2005 | Bernstein et al. |
| 2005/0102370 A1 | 5/2005 | Lin et al. |
| 2005/0102612 A1 | 5/2005 | Allan et al. |
| 2005/0108104 A1 | 5/2005 | Woo |
| 2005/0108624 A1 | 5/2005 | Carrier |
| 2005/0114757 A1 | 5/2005 | Sahota et al. |
| 2005/0114764 A1 | 5/2005 | Gudenkauf et al. |
| 2005/0132043 A1 | 6/2005 | Wang et al. |
| 2005/0132196 A1 | 6/2005 | Dietl |
| 2005/0138031 A1 | 6/2005 | Wefers |
| 2005/0138086 A1 | 6/2005 | Pecht-Seibert |
| 2005/0138539 A1 | 6/2005 | Bravery et al. |
| 2005/0149375 A1 | 7/2005 | Wefers |
| 2005/0149726 A1 | 7/2005 | Joshi et al. |
| 2005/0159136 A1 | 7/2005 | Rouse et al. |
| 2005/0160398 A1 | 7/2005 | Bjornson et al. |
| 2005/0171746 A1 | 8/2005 | Thalhammer-Reyero |
| 2005/0198086 A1 | 9/2005 | Moore et al. |
| 2005/0198125 A1 | 9/2005 | Macleod et al. |
| 2005/0198247 A1 | 9/2005 | Perry et al. |
| 2005/0210263 A1 | 9/2005 | Levas et al. |
| 2005/0223063 A1 | 10/2005 | Chang et al. |
| 2005/0223320 A1 | 10/2005 | Brintzenhofe et al. |
| 2005/0234890 A1 | 10/2005 | Enzler et al. |
| 2005/0240876 A1 | 10/2005 | Myers et al. |
| 2005/0246304 A1 | 11/2005 | Knight et al. |
| 2005/0257148 A1 | 11/2005 | Goodman et al. |
| 2005/0262112 A1 | 11/2005 | Moore |
| 2005/0268217 A1 | 12/2005 | Garrison |
| 2005/0268222 A1 | 12/2005 | Cheng |
| 2006/0010386 A1 | 1/2006 | Khan |
| 2006/0020586 A1 | 1/2006 | Prompt et al. |
| 2006/0026500 A1 | 2/2006 | Qa Im-maqami |
| 2006/0026534 A1 | 2/2006 | Ruthfield et al. |
| 2006/0031757 A9 | 2/2006 | Vincent, III |
| 2006/0036995 A1 | 2/2006 | Chickles et al. |
| 2006/0041838 A1 | 2/2006 | Khan |
| 2006/0059107 A1 | 3/2006 | Elmore et al. |
| 2006/0059434 A1 | 3/2006 | Boss et al. |
| 2006/0069605 A1 | 3/2006 | Hatoun |
| 2006/0069985 A1 | 3/2006 | Friedman et al. |
| 2006/0075245 A1 | 4/2006 | Meier |
| 2006/0080657 A1 | 4/2006 | Goodman |
| 2006/0085409 A1 | 4/2006 | Rys et al. |
| 2006/0101037 A1 | 5/2006 | Brill et al. |
| 2006/0101051 A1 | 5/2006 | Carr et al. |
| 2006/0107206 A1 | 5/2006 | Koskimies |
| 2006/0129583 A1 | 6/2006 | Catorcini et al. |
| 2006/0129978 A1 | 6/2006 | Abrari et al. |
| 2006/0136422 A1 | 6/2006 | Matveief et al. |
| 2006/0143220 A1 | 6/2006 | Spencer, Jr. |
| 2006/0155857 A1 | 7/2006 | Feenan et al. |
| 2006/0161559 A1 | 7/2006 | Bordawekar et al. |
| 2006/0161837 A1 | 7/2006 | Kelkar et al. |
| 2006/0173865 A1 | 8/2006 | Fong |
| 2006/0184393 A1 | 8/2006 | Ewin et al. |
| 2006/0195413 A1 | 8/2006 | Davis et al. |
| 2006/0200754 A1 | 9/2006 | Kablesh et al. |
| 2006/0230363 A1 | 10/2006 | Rapp |
| 2006/0248468 A1 | 11/2006 | Constantine et al. |
| 2007/0005611 A1 | 1/2007 | Takasugi et al. |
| 2007/0036433 A1 | 2/2007 | Teutsch et al. |
| 2007/0050719 A1 | 3/2007 | Lui et al. |
| 2007/0061467 A1 | 3/2007 | Essey et al. |
| 2007/0061706 A1 | 3/2007 | Cupala |
| 2007/0074106 A1 | 3/2007 | Ardeleanu |
| 2007/0088554 A1 | 4/2007 | Harb et al. |
| 2007/0094589 A1 | 4/2007 | Paoli |
| 2007/0100877 A1 | 5/2007 | Paoli |
| 2007/0101280 A1 | 5/2007 | Paoli |
| 2007/0118538 A1 | 5/2007 | Ahern et al. |
| 2007/0118803 A1 | 5/2007 | Walker et al. |
| 2007/0130500 A1 | 6/2007 | Rivers-Moore et al. |
| 2007/0130504 A1 | 6/2007 | Betancourt et al. |
| 2007/0186157 A1 | 8/2007 | Walker et al. |
| 2007/0208606 A1 | 9/2007 | MacKay et al. |
| 2007/0208769 A1 | 9/2007 | Boehm et al. |
| 2007/0276768 A1 | 11/2007 | Pallante |
| 2008/0021916 A1 | 1/2008 | Schnelle et al. |
| 2008/0028340 A1 | 1/2008 | Davis |
| 2008/0052287 A1 | 2/2008 | Stanciu |
| 2008/0126402 A1 | 5/2008 | Sikchi et al. |
| 2009/0070411 A1 | 3/2009 | Chang et al. |
| 2009/0119580 A1 | 5/2009 | Rohrabaugh et al. |
| 2009/0138389 A1 | 5/2009 | Barthel |
| 2009/0177961 A1 | 7/2009 | Fortini et al. |
| 2010/0125788 A1 | 5/2010 | Kelkar et al. |

FOREIGN PATENT DOCUMENTS

| | | |
|---|---|---|
| EP | 0841615 | 11/1999 |
| EP | 0961197 | 12/1999 |
| EP | 1076290 | 2/2001 |
| EP | 1221661 | 7/2002 |
| JP | 3191429 | 1/1900 |
| JP | 63085960 | 4/1988 |
| JP | 401173140 | 7/1989 |
| JP | 401173140 A | 7/1989 |
| JP | 3191429 | 8/1991 |
| JP | 4225466 | 8/1992 |
| JP | 5314152 | 11/1993 |
| JP | 40614105 | 1/1994 |
| JP | 406014105 | 1/1994 |
| JP | 6139241 | 5/1994 |
| JP | 6180697 | 6/1994 |
| JP | 6180698 | 6/1994 |
| JP | 10171662 | 6/1998 |
| JP | 10-2207805 | 8/1998 |
| JP | 10207805 | 8/1998 |
| JP | 2000132436 | 5/2000 |
| JP | 20000132436 | 5/2000 |
| JP | 2002183652 | 6/2002 |
| JP | 2003173288 | 6/2003 |
| WO | WO 99/24945 | 5/1999 |
| WO | WO-9924945 | 5/1999 |
| WO | WO 99/56207 | 11/1999 |
| WO | WO-9956207 | 11/1999 |
| WO | WO 01/44934 | 6/2001 |
| WO | WO-0144934 | 6/2001 |
| WO | WO0157720 | 8/2001 |

OTHER PUBLICATIONS

XmlSpy, "XmlSpy 2004 Enterprise Edition Manual", Altova,(May 17, 2004),1-25, 220-225.
StylusStudio, "StylusStudio: XPath Tools", 2004-2007, StylusStudio,1-14.
Dodds, "Toward an XPath API", xml.com,(May 7, 2001),1-3.
Altova, "Altova Tools for XPath 1.0/2.0", Altova,1-12.
"Microsoft Word 2000 Screenshots", Word,(2000),1-17.
U.S. Appl. No. 60/191,662, Moore et al.
U.S. Appl. No. 60/203,081, Ben-Natan et al.

OMG XML Metadata Interchange (XMI) Specification Version 1.2 Jan. 2002.
Pike et al., "Plan 9 from Bell Labs" UKUUG, Summer 1990, 10 pages.
Berg A., "Naming and Binding: Monikers" Inside OLE, 1995, Chapter 9, pp. 431-490.
Herzner et al., "CDAM- Compound Document Access and Management. An Object-Oriented Approach" Multimedia Systems Interaction and Applications, 1992, Chapter 3, pp. 17-36.
Staneck W., "Internal and External Media" Electronic Publishing Unleashed, 1995, Chapter 22, pp. 510-542.
Kobayashi et al., "An Update on BTRON-specification OS Development" IEEE 1991 pp. 132-140.
Peterson B., "Unix Variants," Unix Review, vol. 10, No. 4, Apr. 1992, pp. 29-31.
"Store and Organize Related Project Files in a Binder," Getting Results with Microsoft Office, 1990, pp. 109-112.
Clapp D., "The NeXT Application Kit Part I: Non-Responsive Classes," The NeXT Bible 1990, Chapter 16, pp. 275-293.
Dilascia et al., "Sweeper" Microsoft Interactive Developer, vol. 1, No. 1, 1996, 27 pages.
Barker et al., "Creating In-Line Objects Within an Integrated Editing Environment," IBM Technical Disclosure Bulletin, vol. 27, No. 5, Oct. 1984, p. 2962.
Pike et al., "The Use of Name Spaces in Plan 9," Operating Systems Review vol. 27, No. 2, Apr. 1993, pp. 72-76.
Clarke P., "From small beginnings" Knowledge Management Nov. 2001, pp. 28-30.
Trupin J., "The Visual Programmer," Microsoft Systems Journal, Apr. 1996, pp. 103-105.
Zdonik S., "Object Management System Concepts," ACM, 1984, pp. 13-19.
Atova, "User Reference manual Version 4.4, XML Spy suite 4.4," Atova Ges.m.b.H and Altova, Inc., May 24, 2002, pages cover, copyright page, 1-565.
Altova et al. XML Spy, XML integrated Development Environments, Altova Inc., 2002, pp. 1-18.
Ben-Natan, U.S. Appl. No. 60/203,081, filed May 9, 2000, entitled "Internet platform for creating and supporting communities".
Ixia Soft, "Steamlining content creation, retrieval, and publishing on the Web using TEXTML Server and SML Spy 4 Suite in an integrated, Web publishing environment," (Partner's Whitepaper, published on the Web as of Jun. 6, 2002, downlowad pp. 1-16.
Kutay, U.S. Appl. No. 60/209,713, filed Jun. 5, 2000, entitled, "Methods and systems for accessing, organizing presenting and viewing data".
Microsoft Word 2000 (see Screen Shot "About Microsoft Word") Published 1983-1999 and Microsoft Excel 2000 (see Screen Shot "About Microsoft Excel") Published 1988-1999, Three pages.
Moore, U.S. Appl. No. 60/191,662, filed Mar. 23, 2000, entitled "Collection-based presistent digital archives".
Pacheco, Xavier et al., "Delphi 5 Developers Guide", Sams Publishing. Chapter 31, Section: Data Streaming,(1999),4.
Altova, Inc., "XML Spy 4.0 Manual," Altova Inc. & Altova GmbH, coyright 1998-2001, Chapters 1, 2, and 6, encompassing pp. 1-17, 18-90, and 343-362.
Cybook, Inc.: "Copying the Search Form to Services-based Web Sites" INternet Article, (online) Jul. 26, 2004.*the whole document*.
Excel Developer Tip (hereinafter "Excel"), "Determining the Data Type of a Cell", May 13, 1998, p. 1 (available at http://jwalk.com/ss//excel/tips/tip62.htm).
Macromedia, Inc.: "Dreamweaver Technote, Changes in copying and pasting in Dreamweaver 4" Internet Article (online). "the whole document".
Rado, Dave: "How to create a template that makes it easy for users to "fill in the blanks", without doing any programming" Microsoft Word MVP FAQ Site, (online) Apr. 30, 2004, the whole document.
"Enter Key", Retrieved from the Internet at http://systems.webopedia.com/TERM/Enter_key.html on Dec. 20, 2006.
"Microsoft Visual Basic 5.0 Programmer's Guide", *Microsoft Press*, (1997),pp. 42-43, 54-58.
"Microsoft Word 2000", Screenshots,(1999),1-5.

Beauchemin, Dave , "Using InfoPath to Create Smart Forms", Retrieved from the Internet at http:/www.microsoft.com/office/infopath/prodinfo/using.mspx on Jan. 21, 2007,(Mar. 27, 2003).
Begun, Andrew , et al., "Support and Troubleshooting for XML Schemas in InfoPath 2003", *Microsoft Office InfoPath 2003 Technical Articles*, Retrieved from the Internet at http://msdn2.microsoft.com/en-us/library/aa168241(office.11,d=printer).aspx on Jan. 21, 2007,(Aug. 2004).
Borland, Russo , "Running Microsoft Word 97", 314-315, 338, 361-362, 390, and 714-719.
Dubinko, Micah , "XForms and Microsoft InfoPath", Retrieved from the Internet at http://www.xml.com/lpt/a/1311 on Jan. 21, 2007,(Oct. 29, 2003).
Hoffman, Michael , "Architecture of Microsoft Office InfoPath 2003", *Microsoft Office InfoPath 2003 Technical Articles*, Retrieved from the Internet at http://msdn2.microsoft.com/en-us/library/aa219024/office.11,d=printer).aspx on Jan. 21, 2007,(Jun. 2003).
Lehtonen, Miro , et al., "A Dynamic User Interface for Document Assembly", Department of Computer Science, University of Helsinki,(Nov. 2002).
Nelson, Joe , "Client-side Form Validation Using JavaScript", *Developer Advisory*, (Sep. 21, 2001).
Raman, T. V., et al., "XForms 1.0", (Dec. 2001),Section 1-12.2.3 & Appendices A-G.
Rees, Michael J., "Evolving the Browser Towards a Standard User Interface Architecture", School of Information Technology, Bond University, Australia,(2001).
Singh, Darshan , "Microsoft InfoPath 2003 by Example", Retrieved from the Internet at http://www.perfectxml.com/InfoPath.asp on Jan. 21, 2007,(Apr. 20, 2003).
Udell, Jon , "InfoPath and XForms", Retrieved from the Internet at http://weblog.infoworld.com/udell/2003/02/26.html,(Feb. 26, 2003).
Brabrand, et al., "Power Forms Declarative Client-side Form Field Validation", (2002),1-20.
Anat, Eyal et al., "Integrating and Customizing Hererogeneous E-Commerce Applications", The VLDB Journal-The International Journal on Very Large Data Bases, vol. 10, Issue 1,(Aug. 2001),16-38.
Adams, Susie et al., "BizTalk Unleashed", Sams publishing, 2002, first printing Mar. 2001,1-2, 31-138.
Vasters, Clemens F., "BizTalk Server 2000 A Beginner's Guide", Osborne/McGraw-Hill,(2001),1-2, 359-402.
Halberg, Bruce et al., "Using Microsoft Excel 97", (1997),191-201, 213-219.
Villard, et al., "An Incremental XSLT Transformation Processor for XML Document Manipulation", http://www2002.org/CDROM/refereed/321, Printed on May 18, 2007,(May 2002),25 pages.
U.S. Appl. No. 60/209,713, filed Jan. 1, 1900, Kutay et al.
"Netscape window" Netscape SCR; "Netscape window" Netscape Screenshot Oct. 2, 2002.
Chien Shu-Yao et al. 2Efficien; Efficient Management of Multiversion Documents by Object Referencing Proceedings of the 27th VLDB Conference 2001 pp. 291-300.
Chien Shu-Yao et al. Efficient; "Efficient schemes for managing mulitversion XML documents" VLDB Journal (2002) pp. 332-352.
Chien Shu-Yao et al. Storing a; "Storing and Querying Multiversion XML Documents using Durable Node Numbers" IEEE 2002 pp. 232-241.
Chien Shu-Yao et al. XML Docum; "XML Document Versioning" SIGMOD Record vol. 30 No. 3 Spet 2001 p. 46-53.
Dyck Timothy XML Spy Tops as X; "XML Spy Tops as XML Editor" http://www.eweek.com/article2/0395972404100.asp Nov. 25, 2002 4 pages.
Haukeland Jan-Henrick Tsbiff -; "Tsbiff—tildeslash biff—version 1.2.1" Internet Document [Online] Jun. 1999 URL: http://web.archive.org/web/19990912001527/http://www.tildeslash.com/tsbiff/.
Nelson Mark Validation with MS; "Validation with MSXML and XML Schema" Windows Developer Magazine Jan. 2002 pp. 35-38.

Noore A. A secure conditional; "A secure conditional access system using digital signature and encryption" 2003 Digest of Technical Papers. International Conference on Consumer Electronics Jun. 2003 pp. 220-221.
Rogge Bories et al. Validating; "Validating MPEG-21 Encapsulated Functional Metadata" IEEE 2002 pp. 209-212.
Wong Raymond K. et al. Managin; "Managing and Querying Multi-Version XML Data with Update Logging" DocEng '02 Nov. 8-9, 2002 Copyright 2002 ACM 1-58113-594-7/02/0011 pp. 74-81.
Architecture for a Dynamic In; "Architecture for a Dynamic Information Area Control" IBM Technical Disclosure Bulletin IBM Corp. New York US vol. 37 No. 10 Jan. 10, 1994. pp. 245-246.
Alschuler Liora A tour of Xmet; "A tour of Xmetal" O'Reilly XML.COM 'Online Jul. 14, 1999 XP002230081 retrieved from the internet: <URL:http://www.xml.com/pub/a/SeyboldReport/ip0311025.html> retrieved on Feb. 5, 2003.
Au Irene et al. Netscape Commu; "Netscape Communicator's Collapsible Toolbars" CHI'98 Human Factors in Computing Systems Conference Proceedings Los Angeles CA Apr. 18-23, 1998 pp. 81-86.
Battle Steven A. et al. Flexib; "Flexible Information Presentation with XML" 1998 the Institution of Electrical Engineers 6 pages.
Brogden William Arbortext Adep; "Arbortext Adept 8 Editor Review" O'Reilly XML.COM 'Online! Sep. 22, 1999 XP002230080 retrieved from the Internet <URL:http://www.xml.com/pub/a/1999/09/adept/AdeptRvw.htm> retrieved on Feb. 5, 2003.
Ciancarini Paolo et al. Managi; "Managing Complex Documents Over the WWW: A Case Study for XML" IEEE Transactions on Knowledge and Data Engineering vol. 11 No. 4 Jul./Aug. 1999. pp. 629-938.
Davidow< ARI SML Editors: Alle; "XML Editors: Allegations of Functionality in search of reality" • Internet 'Online! 1999 XP002230082 retrieved from the Internet <URL:http://www.ivritype.com/xml/>.
Kanemoto Hirotaka et al An Eff; "An Efficiently Updatable Index Scheme for Structured Documents" 1998 IEEE pp. 991-996.
Netscape Communication Corpora; "Netscape Communicator 4.61 for OS/2 Warp" Software 1999 The whole software release & "Netscape—Version 4.6 [en]-010615" Netscape Screenhot Oct. 2, 2002.
Sutanthavibul Supoj et al. XFI; "XFIG Version 3.2 Patchlevel 2 (Jul. 2, 1998) Users Manual (Edition 1.0)" Internet Document [Online] Jul. 2, 1998 XP002229137 Retrieved from the Internet: <URL:http://www.ice.mtu.edu/online_docs/xfig332/> [retrieved on Jan. 28, 2003].
Usdin Tommie et al. XML: Not a; "XML: Not a Silver Bullet But a Great Pipe Wrench" Standardview vol. 6. No. 3 Sep. 1998 pp. 125-132.
Chen Yi et al. XKvalidator: A; "XKvalidator: A Constraint Validator for XML" CIKM '-2 Nov. 4-9, 2002 Copyright 2002 ACM 1-58113-4924-4/02/0011 pp. 446-452.
Cheng Ya Bing et al. Designing; "Designing Valid XML Views" ER 2002 LNCS 2503 2002 Springer-Verlag Berlin Heidelberg 2002 pp. 463-477.
Chuang Tyng-Ruey Generic Valid; "Generic Validation of Structural Content with Parametric Modules" ICFP '01 Sep. 3-5, 2001 Copyright 2001 ACM 1-58113-415-0/01/0009 pp. 98-109.
Dayton Linnea and Jack Davis P; "Photo Shop 5/5.5 WOW! Book" 2000 Peachpit Press pp. 8-17.
Hall Richard Scott Agent-based; "Agent-based Software Configuration and Deployment" Thesis of the Univeristy of Colorado Online Dec. 31, 1999 retrieved from the Internet on Nov. 7, 2003: <http://www.cs.colorado.edu/users/rickhall/documents/ThesisFinal.pdf> 169 pages.
Hardy Mathew r. B. et al. Mapp; "Mapping and Displaying Structural Transformations between XML and PDF" DocEng '02 Nov. 8-9, 2002 Copyright 2002 ACM 1-58113-597-7/02/0011 pp. 95-102.
Kim Sang-Kyun et al. Immediate; "Immediate and Partial Validation Mechanism for the Conflict Resolution of Update Operations in XML Databases" WAIM 2002 LNCS 2419 2002 pp. 387-396 Springer-Verlag Berlin Heidelberg 2002.
Netscape Communication Corp Sm; "SmartUpdate Developers Guide" Online Mar. 11, 1999 retrieved from the Internet on Dec. 8, 2000: <http://developer.netscape.com:80/docs/manuals/communicator/jarman/index.htm> 83 pages.
Van Hoff Arthur et al. The Ope; "The Open Software Description Format" Online Aug. 13, 1997 retrieved from the Internet on Nov. 7, 2003: <http://www.w3.org/Tr/Note-Osd> 11 pages.
Verlamis Iraklis et al. Bridgi; "Bridging XML-Schema and relational databases. A System for generating and manipulating relational databases using valid XML documents." DocEng '01 Nov. 9-10, 2001 Coppyright 2001 ACM 1-58113-432-0/01/0011 pp. 105-114.
Williams< Sara and Charlie Kin; "The Component Object Model" A Technical Overview Oct. 1994 Microsoft Corp. pp. 1-14.
Description of Whitehill Compo; Description of Whitehill Composer software product producted by Whitehill Technologies Inc. available at <http://www.xml.com/pub/p/221> accessed on Apr. 8, 2004 two pages.
Hwang et al. Micro-Firewalls f; "Micro-Firewalls for Dynamic Network Security with Distributed Intrusion Detection"; IEEE INternational Symposium on Network Computing and Applications; 2001; pp. 68-79.
Kaiya et al. Specifying Runtim; "Specifying Runtime Environments and Functionalities of Downloadable Components Under the Sandbox Mode"; International Symposium on Principles of Software Evolution; 2000; pp. 138-142.
Komatsu N. et al. A proposal o; "A Proposal on Digital Watermark in Document Image Communication and Its Application to Realizing a Signature" Electronics and Communications in Japan Part I: Communications vol. 73 No. 5 May 1990 pp. 22-33.
Pacheco et al. Delphi 5 Develo; "Delphi 5 Developers Guide" Sams Publishing 1999 Chapter 31 Section: Data Streaming 6 pages.
Prevelakis et al. Sandboxing A; "Sandboxing Applications"; Proceedings of the FREENIX Track; 2001; pp. 119-126.
Rapaport L. Get more from Shar; "Get more from SharePoint" Transform Magazine vol. 11 No. 3. Mar. 2002 pp. 1315.
Schmid et al. Protection Data; "Protection Data from Malicious Software"; 18th Annual Computer Security Applications Conference; 2002; pp. 199-208.
Sun Q. et al. A robust and sec; "A robust and secure media signature scheme for JPEG images" Proceedings of 2002 IEEE Workshop on Multimedia Signal Processing Dec. 2002 pp. 296-299.
Tomimori et al. An Efficient a; "An Efficient and Flexible Access Control Framework for Java Programs in Mobile Terminals"; 22nd International Conference on Distributed Computing Systems Workshops; 2002; pp. 777-782.
Whitehill "Whitehill Composer"; "Whitehill Composer" Whitehill Technologies Inc. 2 pages.
Clark James—W3C Editor; "XSL Transformation (XSLT) Verison 1.0" Nov. 16, 1999 W3C (MIT INRIA Kejo) pp. 1-156.
McCright J.S. New Tool Kit to; "New Tool Kit to Link Groove with Microsoft Sharepoint" eWeek Enterprise News & Reviews Ziff Davis Media INc. Jul. 29, 2002 1 page.
Musgrave S Networking technolo; "Networking technology—impact and opportunities" Survey and Statistical Computing 1996. Proceedings of the Second ASC International Conference. Sep. 1996. pp. 369-378. London UK.
Rapaport L Get more from Share; "Get more from SharePoint" Transform Magazine vol. 11 No. 3. Mar. 2002 pp. 1315.
W3C Editor James Calrk and Ste; "XML Path Language (XPath) Version 1.0" Nov. 16, 1999W3C (MIT INRIA Kejo) pp. 1-49.
Cover; XML Forms Architecture, retrieved at << http://xml.coverpages.org/xfe.html>> on Aug. 17, 2006, Coverpages, Jun. 16, 1999.
Raggett, "HTML Tables", retrieved on Aug. 6, 2006, at <<http://www://is-edu.hcmuns.edu.vn/WebLib/books/Web/Tel/html3-tables.html>>, W3C Internet Draft, Jul. 7, 1995, pp. 1-12.
"Webopedia Computer Dictionary" retrieved on May 9, 2006, at <<http://www.pewebopedia.org/TERM/O/OLE.html>>, Jupitermedia Corporation, 2006, pp. 1-7.
Grosso, et al., "XML Fragment Interchange", W3C,(Feb. 2001),1-28.
Altova, et al., "User and Reference Manual Version 4.4", www.xmlspy.com, (May 24, 2007),1-565.
"XForm 1.0", W3C,(Jul. 16, 2001).

Laura Aciden & Read Gilgen, "Using Corel Wordperfect 9", 251-284, 424-434, 583-586 (1998).
Bruce Heiberg et al, "Using Microsoft Excel 97", Published 1997, Bestseller Edition, Pertinent pp. 1-9, 18-25, 85-89, 98-101, 106-113, 124-127, 144-147, 190-201, 209-210, 218-227, 581-590, 632-633, 650-655, 712-714.
Leblond et al, "PC Magazine Guide to Quattro Pro for Windows", pp. 9-11, 42-61, Ziff-Davis Press, Copyright 1993 by the LeBlond Group.
Mansfield, "Excel 97 for Busy People", Published by Osborne/Mcgraw-Hill 1997 pp. 48-50.
"Microsoft Visual Basic 5.0 Programmer's Guide 1997"; pp. 578-579; Redmond WA 98052-6399.
Han et al., WebSplitter: A Unified XML Framework for Multi-Device Collaborative Web Browsing, 2000, ACM on Cimputer Supported Cooperative Work, 10 pages.
IBM: Stack Algorithm for Extractin Subtree from Serialized Tree, Mar. 1, 1994, TDB-ACC-NONN94033, 3 pages.
Microsoft Corporation, "Microsoft Computer Dictionary" Microsoft Press, Fifth Edition, p. 149.
Hu, et al., "A Programmable Editor for Developing Structured Documents based on Bidirectional Transformations", ACM,(Aug. 2004),178-179.
Bradley, Neil "The XML Companion, Third Edition", *Published by Addison Wesley Professional*, http://proquest.safaribooksonline.com0201770598,http,(Dec. 12, 2001),1-18.
Klarlund, Nils "DSD: A Schema Language for XML", *ACM, FSMP* Portland Oregon, (2000),101-111.
Watt, Andrew "Microsoft Office Infopath 2003 Kick Start", *(Published by Sams)* Print ISBN-10:0-672-32623-X, (Mar. 24, 2004),1-57.
Kay, Michael "XSL Transfommations (XSLT) Version 2.0", http://www.w3.org//TR/2005/WD-xslt20-20050404 (04/205),1-374.
"Notice of Allowance", U.S. Appl. No. 10/404,312, (Jan. 12, 2009),12 pages.
"Final Office Action", U.S. Appl. No. 10/857,689, (Jan. 6, 2009),23 pages.
"Non Final Office Action", U.S. Appl. No. 10/977,198, (Feb. 2, 2009),15 pages.
"Non Final Office Action", U.S. Appl. No. 10/939,588, (Feb. 18, 2009),40 pages.
"Non Final Office Action", U.S. Appl. No. 10/976,451, (Feb. 23, 2009),39 pages.
"Non final Office Action", U.S. Appl. No. 11/234,767, (Feb. 26, 2009),37 pages.
"Notice of Allowance", U.S. Appl. No. 11/167,514, (Mar. 11, 2009),6 pages.
"Non Final Office Action", U.S. Appl. No. 10/942,528, (Mar. 6, 2009),31 pages.
"Non Final Offfice Action", U.S. Appl. No. 11/170,521, (Jan. 21, 2009),86 pages.
"Foreign Office Action", Application Serial No. 2,412,611, (Feb. 9, 2009),6 pages.
"Foreign Office Action", Application Serial No. 200610003709.2, (Jan. 9, 2009),8 pages.
"EP Office Action", Application Serial No. 06111546.5, (Oct. 15, 2008),5 pages.
"Notice of Re-Examination", Application Serial No. 01813138.7, (Mar. 11, 2009),27 pages.
Bray, Tim "Extensible Markup Language (XML)", http://www.textuality.com/sgml-erb/WD-xml.html, second named inventor Jean Paoli, third named inventor C.M. Sperberg-McQueen,(Feb. 10, 1998),37 pages.
Hall, Richard S., "Agent-based Software Configuration and Development", http://www.doc.ic.ac.uk/~alw/edu/theses/hall-phd-0599.pdf on Jun. 8, 2009, Thesis of the University of Colorado,(May 1, 1999),182 pages.
Acklen, et al., "Using Corel Wordperfect 9", Que Corporation(1998),pp. 251-284, 424-434, 583-585.
"Notice of Allowance", U.S. Appl. No. 10/988,718, (Apr. 9, 2009),17 pages.
"Final Office Action", U.S. Appl. No. 11/107,347, (Feb. 2, 2009),15 pages.

"Restriction Requirement", U.S. Appl. No. 11/227,550, (Apr. 2, 2009),8 pages.
"Non Final Office Action", U.S. Appl. No. 10/955,665, (Apr. 2, 2009),19 pages.
"Non Final Office Action", U.S. Appl. No. 10/988,720, (Apr. 2, 2009),19 pages.
"Final Office Action", U.S. Appl. No. 11/203,818, (Apr. 14, 2009),31 pages.
"Final Office Action", U.S. Appl. No. 11/044,106, (Apr. 13, 2009),20 pages.
"Final Office Action", U.S. Appl. No. 11/226,044, (Apr. 20, 2009),24 pages.
"Final Office Action", U.S. Appl. No. 11/056,500, (Apr. 16, 2009),10 pages.
"Final Office Action", U.S. Appl. No. 11/203,937, (May 7, 2009),13 pages.
"Non Final Office Action", U.S. Appl. No. 10/955,666, (May 7, 2009),28 pages.
"Non Final Office Action", U.S. Appl. No. 10/876,433, (Apr. 24, 2009),62 pages.
"Non Final Office Action", U.S. Appl. No. 09/599,809, (May 13, 2009),25 pages.
"Non Final Office Action", U.S. Appl. No. 11/295,178, (May 27, 2009),111 pages.
"Non Final Office Action", U.S. Appl. No. 10/990,152, (May 28, 2009),19 pages.
"Final Office Action", U.S. Appl. No. 11/036,910, (Jun. 1, 2009),15 pages.
"Non Final Office Action", U.S. Appl. No. 10/857,689, (Jun. 11, 2009),25 pages.
"Non Final Office Action", U.S. Appl. No. 11/095,254, (Jun. 8, 2009),21 pages.
"Final Office Action", U.S. Appl. No. 11/234,767, (Jun. 10, 2009),24 pages.
"Foreign Office Action", Application Serial No. 2002-503702, Final Notice of Rejection,(Jun. 5, 2009),212 pages.
Kaori, Iwantani et al., "Perfect Manual of Clarisworks 4.0 for Macintosh", 1st Edition, Japan,(07/297),pp. 153-167.
Noriko, Matsushita "Step-up Training of Clarisworks (tabulation), Successful Use of Spreadsheet and Tabulation", Mac People, vol. 4, No. 19,(Oct. 1, 1998),pp. 138-139.
Akihiro, Senda "Word 2000, Conservative- Looking but 'Attentive' New Function", Nikkei PC 21, vol. 4, No. 8,(Aug. 1, 1999), pp. 115-116.
Yasuji, Fukuhara "Clarisworks, Introduction to Business Document Construction, No. 4, Estimate", Nikkei Mac, No. 14,(May 17, 1994),pp. 197-204.
"Final Office Action", U.S. Appl. No. 10/976,451 (Jul. 2, 2009),(May 4, 2006),13 pages.
Reagan, Moore W., et al., "Collection-based persistent digital archives", U.S. Appl. No. 60/191,662, filed Mar. 23, 2000, 133.
"Non-Final Office Action", U.S. Appl. No. 11/227,550, (Aug. 3, 2009),10 pages.
"Notice of Allowance", U.S. Appl. No. 11/203,937, (Aug. 3, 2009),7 pages.
"Foreign Office Action", Application Serial No. 200610051554.X, (Jul. 10, 2009),11 pages.
"Non-Final Office Action", U.S. Appl. No. 11/234,767, (Aug. 12, 2009),24 Pages.
"Final Office Action", U.S. Appl. No. 10/977,198, (Aug. 19, 2009),15 pages.
"Non-Final Office Action", U.S. Appl. No. 10/939,588, (Aug. 27, 2009),28 pages.
"Final Office Action", U.S. Appl. No. 11/170,521, (Sep. 8, 2009),12 pages.
"Final Office Action", U.S. Appl. No. 10/402,640, (Aug. 28, 2009),17 pages.
"Non-Final Office Action", U.S. Appl. No. 11/170,521, (Dec. 17, 2009),11 pages.
"Notice of Allowance", U.S. Appl. No. 10/990,152, (Dec. 21, 2009),6 pages.
Honkala, Mikko et al., "Multimodal Interaction with XForms", *ICWE '06*, (2006),pp. 201-208.

"Final Office Action", U.S. Appl. No. 11/295,178, (Dec. 24, 2009),38 pages.
"Final Office Action", U.S. Appl. No. 11/227,550, (Jan. 19, 2010), 12 pages.
"Final Office Action", U.S. Appl. No. 11/234,767, (Jan. 26, 2010), 23 pages.
"Foreign Office Action", Application Serial No. 200610051544.X, (Dec. 4, 2009), 9 pages.
"Non-Final Office Action", U.S. Appl. No. 10/402,640, (Dec. 30, 2009), 16 pages.
"Non-Final Office Action", U.S. Appl. No. 11/218,149, (Jan. 14, 2010), 15 Pages.
"Non-Final Office Action", U.S. Appl. No. 12/021,894, (Dec. 31, 2009), 10 pages.
"Notice of Allowance", U.S. Appl. No. 10/955,665, (Dec. 30, 2009), 2 pages.
"Notice of Allowance", U.S. Appl. No. 11/872,703, (Jan. 27, 2010), 19 pages.
"Architecture for a Dynamic Information Area Control", IBM Technical Disclosure Bulletin, IBM Corp, NY, US vol. 37, No. 10, Jan. 10, 1994,, pp. 245-246.
"Copying the Search Form to Custom Pages in Windows SharePoint Services-based Web Sites", Retrieved from <www.sharepointcustomization.com/resources/tipstricks/04-wss-searchbox-tip.htm> (Feb. 11, 2009), Microsoft Corp,(2003), 1 page.
"Excel Developer Tip: Determining the Data Type of a Cell", Retrieved from <http://jwalk.com/ss/excel/tips/tip62.htm>, (May 13, 1998), 1 page.
"Final Office Action", U.S. Appl. No. 11/557,931, (Feb. 26, 2010), 8 pages.
"Foreign Notice of Allowance", Mexican Application No. PA/a/2005/012067, (Nov. 13, 2009), 3 pages.
"Netscape Communicator 4.61 for OS/2 Warp", Netscape Communication Corporation, Software 1999, The Whole software release & Netscape—Version 4.61 {en}—010615, Netscape Screenshot,(Oct. 2, 2002), 1 page.
"Non-Final Office Action", U.S. Appl. No. 11/227,550, (Mar. 10, 2010), 12 pages
"Notice of Allowance", U.S. Appl. No. 11/044,106, (Mar. 15, 2010), 7 pages.
"Notice of Allowance", U.S. Appl. No. 11/072,087, (Feb. 23, 2010), 4 pages.
"Notice of Allowance", U.S. Appl. No. 11/093,588, (Mar. 10, 2010), 10 pages.
"OMG XML Metadata Interchange (XMI) Specification", Retrieved from : <http://www.omg.org/cgi-bin/doc?formal/02-01-01.pdf> on Dec. 2, 2009, Version 1.2,(Jan. 2002), 268 pages.
"SmartUpdate Developers Guide", Retrieved from http://developer.netscapte.com:80/docs/manuals/communicator/jarman/index.htm on Dec. 8, 2000, Netscape Communications Corp,(Mar. 11, 1999), 83 pages.
"Stack Algorithm for Extracting Subtree from Serialized Tree", *IBM Technical Disclosure Bulletin*, TDB-ACC-No. NN94033, (Mar. 1, 1994), 2 pages.
"Store and Organize Related Project Files in a Binder", Getting results with Microsoft Office,(1990), pp. 109-112.
"Streamlining Content Creation", Ixia Soft Jun. 6, 2002, pp. 1-16.
"Supplemental Notice of Allowance", U.S. Appl. No. 10/955,665, (Feb. 4, 2010), 2 pages.
"Supplemental Notice of Allowance", U.S. Appl. No. 10/955,665, (Nov. 27, 2009), 2 pages.
"Supplemental Notice of Allowance", U.S. Appl. No. 10/955,665, (Mar. 5, 2010), 2 pages.
"Validation with MSXML and XML Schema", *Windows Developer Magazine*, (Jan. 1, 2002), 5 pages.
"Whitehill Composer Software product", Retrieved from www.xml.com/pub/p/221 on Apr. 8, 2004, Whitehill Technologies, Inc.,(Apr. 8, 2004), 2 pages.
"XML Forms Architecture (XFA)", Retrieved from http://xml.coverpades.org/xfa.html on Aug. 17, 2006, Cover Pages Technology Reports,,(Jun. 16, 1999), p. 1.

Alschuler, Liora "A Tour of XMetal", Retrieved from: <http://www.xml.com/pub/a/SeyboldReport/ip031102.html> on Feb. 5, 2003, XML.com, Online! XPOO2230081,(Jul. 14, 1999), 3 pages.
Altova, "XML Spy 4.0 Manual", *1998-2001 Altova Inc. & Altova GmbH*, (Sep. 10, 2001), pp. 1-90, 343-362.
Altova, et al., "XML Spy, XML Integrated Development Environments", Altova Inc.,(2002), pp. 1-18.
Au, Irene et al., "Netscape Communicator's Collapsible Toolbars", CHI 98, Human Factors in Computing Systems, Conference Proceedings, LA, CA,(Apr. 18-23, 1998), pp. 81-86.
Barker, et al., "Creating In-Line Objects Within an Integrated Editing Environment", IBM Technical Disclosure Bulletin, vol. 27, No. 5,(Oct. 1984), p. 2962.
Battle, Steven A., et al., "Flexible Information Presentation with XML", *The Institution of Electrical Engineers*, (1998), 6 pages.
Ben-Natan, Ron et al., "Internet Platform for Creating and Supporting Communities", U.S. Appl. No. 60/203,081, filed May 9, 2000, 31 pages.
Berg, A "Naming and Binding: Monikers", *Inside OLE, Chapter 9, Harmony Books*, (1995), pp. 431-490.
Brogden, William "Arbortext Adept 8 Editor Review", Retrieved from: <www.xml.com/pub/a/1999/09/adept/AdeptRvw.htm> on Feb. 5, 2003, O'Reilly XML.COM, Online!,(Sep. 22, 1999), 4 pages.
Chen, Ya B., et al., "Designing Valid XML Views", S. Spaccapietra, S.T. March, and Y. Kambayashi (Eds.): ER 2002, LNCS 2503, Copyright: Springer-Verlag Berlin Heidelberg 2002,(2002), pp. 463-477.
Chen, Yi et al., "XKvalidator: A Constraint Validator for XML", *CIKM '02*, Nov. 4-9, 2002, McLean, VA, USA, Copyright 2002, ACM, ISBN 1-58113-492-4/02/0011,(Nov. 4-9, 2002), pp. 446-452.
Chien, et al., "Efficient Management of Multiversion Documents by Object Referencing", Proceedings of the 27th VLDB Conference,(2001), pp. 291-300.
Chien, Shu-Yao et al., "Efficient Schemes for Managing Multiversion XML Documents", *The VLDB Journal 2002*, (Dec. 19, 2002), pp. 332-353.
Chien, Shu-Yao et al., "Storing and Querying Multiversion XML Documents using Durable Node Numbers", IEEE,(2002), pp. 232-241.
Chien, Shu-Yoa et al., "XML Document Versioning", SIGMOD Record, vol. 30, No. 3,,(Sep. 2001), pp. 46-53.
Chuang, Tyng-Ruey "Generic Validation of Structural Content with Parametric Modules", *ICFP 2001 International Conference on Functional Programming*, vol. 36, No. 10, Available at <http://citeseerx.ist.psu.edu/viewdoc/download?doi=10.1.1.7.6412&rep=rep1&type=pdf>,(Sep. 3, 2001), 12 pages.
Ciancarini, Paolo A., et al., "Managing Complex Documents Over the WWW: A Case Study for XML", *Transactions on Knowledge and Data Engineering*, vol. 11, No. 4, Available at <http://citeseerx.ist.psu.edu/viewdoc/download?doi=10.1.1.18.1679&rep=rep1&type=pdf>,(Apr. 1999), pp. 1-14.
Clapp, D "The NeXT Application Kit Part 1: Non-Responsive Classes", *The NeXT Bible Chapter 16*, (1990), pp. 275-293.
Clark, James "XSL Transformation (XSLT), Version 1.0", Retrieved from: <www.w3.org/TR/1999/REC-xslt19991116> on Oct. 26, 2009, WC3,(Nov. 16, 1999), 57 pages.
Clark, James et al., "XML Path Language (XPath)", Retrieved from: <www.w3.org/TR/1999/RCE-xpath-19991116> on Oct. 26, 2009, Version 1.0,(Nov. 16, 1999), 37 pages.
Clark, Peter "From Small Beginnings", *Knowledge Management*, (Nov. 2001), pp. 28-30.
Cover, Robin "XML Forms Architecture (XFA)", Cover Pages. Retrieved from "http://xml.coverpages.org/xfa.html" on Aug. 17, 2006, (Apr. 19, 2000), 4 pages.
Davidow, Ari "XML Editors: Allegations of Functionality in Search of Reality", Retrieved from: <http://www.ivritype.com/xml/> on Feb. 9, 2009, SP002230082,(Oct. 12, 1999), 16 pages.
Dayton, Linnea et al., "Photo Shop 5/5.5 WOW! Book", *2000, Peachpit Press*, (2000), pp. 8-17.
Dilascia, Paul et al., "Sweeper", *Microsoft interactive developer*, vol. 1., No. 1, (1996), pp. 16-52.
Dorward, Sean et al., "Unix Variants", *Unix Review*, vol. 10, No. 4, (Apr. 1992), pp. 29-31.

Dyck, Timothy "XML Spy Tops as XML Editor", *eWeek*, vol. 19, No. 47.. (Nov. 25, 2002), 3 pages.

Halberg, et al., "Using Microsoft Excel 97", Que Corporation(1997), pp. 1-9, 18-25, 85-89, 98-101, 106-113, 124-127, 144-147, 190-201, 209-210, 213-227, 581-590, 632-633, 650-655, 712-714.

Han, Richard et al., "Websplitter: A Unified XML Framework for Multi-Device Collaborative Web Browsing", *ACM Conference on Computer Supported Cooperative Work*, (2000), 10 pages.

Hardy, Matthew R., et al., "Mapping and Displaying Structural Transformations between XML and PDF", *Proceedings of the 2002 ACM symposium on Document engineering*, (Nov. 8-9, 2002), pp. 95-102.

Haukeland, Jan-Henrick "Tsbiff-tildeslash biff— Version 1.2.1", http://web.archive.org/web/19990912001527/http://www.tildeslash.com/tsbiff/., (Jun. 1999), 2 pages.

Herzner, Wolfgang et al., "CDAM-Compound Document Access and Management. An Object-Oriented Approach", *ACM SIGOIS Bulletin*, vol. 12 , Issue 1, MultiMedia Systems Interaction and Applications, Chapter 3,,(Jul. 1991), 18 pages.

Hwang, Kai et al., "Micro-Firewalls for Dynamic Network Security with Distributed Intrusion Detection", *IEEE International Symposium on Network Computing and Applications 2001*, (2001), pp. 68-79.

Kaiya, Haruniko et al., "Specifying Runtime Environments and Functionalities of Downloadable Components under the Sandbox Model", *International Symposium on Principles of Software Evolution 2000*, (2000), pp. 138-142.

Kanemoto, Hirotaka et al., "An Efficiently Updatable Index Scheme for Structured Documents", *DEXA'98*, (1998), pp. 991-996.

Kim, Sang-Kyun et al., "Immediate and Partial Validation Mechanism for the Conflict Resolution of Update Operations in XML Databases", *WAIM 2002, LNCS 2419, 2002, Springer-Verlag Berlin Heidelberg*, (2002), pp. 387-396.

Kobayashi, M. et al., "An Update on BTRON-specification OS Development", *Proceedings of the 8thTRON Project Symposium, 1991*, 0-8186-2475-2/91,(1991), pp. 132-140.

Komatsu, Naohisa et al., "A Proposal on Digital Watermark in Document Image Communication and It's Application to Realizing a Signature", *Electronics and Communication in Japan, Part I: Communications*, vol. 73, No. 5, (May 1990), pp. 22-33.

Kutay, Ali et al., "Methods and Systems for Accessing, Organizing, Presenting and Viewing Data", U.S. Appl. No. 60/209,713, Kutay et al., filed Jun. 5, 2000, 345 pages.

LeBlond, et al., "PC Magazine Guide to Quattro Pro for Windows", Ziff-Davis Press,(1993), pp. 9-11, 42-61.

Mansfield, Ron "Excel 97 for Busy People", Osborne/McGraw-Hill,,(Jan. 27, 1997), pp. 48-50.

McCright, John S., "New Tool Kit to Link Groove with Microsoft SharePoint", Retrieved from: <http://www.eweek.com/c/a/Enterprise-Applications/New-Tool-Kit-to-Link-Groove-With-Microsoft-SharePoint/> on Dec. 28, 2009, (Jul. 29, 2002), 3 pages.

Musgrave, S "Networking Technology—Impact and Opportunities", *Survey and Statistical Computing 1996, Proceedings of the Second ASC International Conference*, London, UK,, (Sep. 1996), pp. 369-378.

Noore, Afzel "A Secure Conditional Access System using Digital Signature and Encryption", *International Conference on Consumer Electronics*, (Jun. 2003), pp. 220-221.

Pike, Rob et al., "Plan 9 From Bell Labs", AT&T Bell Laboratories, UKUUG, Summer 1990,(1990), 10 pages.

Pike, Rob et al., "The Use of Name Spaces in Plan 9", *Operating Systems Review*, vol. 27, No. 2, (Apr. 1993), pp. 72-76.

Prevelakis, Vassilis et al., "Sandboxing Applications", *FREENIX Track: 2001 USENIX Annual Technical Conference*, (2001), pp. 119-126.

Rado, Dave "How to create a template that makes it easy for users to 'fill in the blanks' without doing any programming,", Retrieved from http://word.mvps.org/FAQs/Customization/FillinTheBlanks.htm, (Apr. 2004), pp. 1-2.

Raggett, "HTML Tables", Retrieved from: <http:www.//is-edu.homuns.edu.vn/WebLib/books/Web/Tel/html3-tables.html> on Aug. 6, 2006, W3C Internet Draft,(Jul. 7, 1995), pp. 1-12.

Rapaport, Lowell "Get More From SharePoint", *Transform Magazine*, vol. 11, No. 3, (Mar. 2002), 2 pages.

Rogge, Boris et al., "Validating MPEG-21 Encapsulated Functional Metadata", *IEEE 2002*, ISBN 0-7803-7304-9/02,(2002), pp. 209-212.

Schmid, Mathew et al., "Protecting Data from Malicious Software", *18th Annual Security Applications Conference*, (2002), pp. 199-208.

Staneck, W "Internal and External Media", *Electronic Publishing Unleashed*, Chapter 22,(1995), pp. 510-542.

Sun, Qibin et al., "A Robust and Secure Media Signature Scheme for JPEG Images", *Proceeding of 2002 IEEE Workshop on Multimedia Signal Processing*, (Dec. 2002), pp. 296-299.

Sutanthavibul, Supoj et al., "XFIG Version 3.2 Patchlevel 2 (Jul. 2, 1998) Users Manual (Edition 1.0)", Retrieved from: <www.ice.mtu.edu/online_docs/sfig332/> on Jan. 28, 2003, Internet Document XP002229137,(Jul. 2, 1998), 60 pages.

Tomimori, Hiroyuki et al., "An Efficient and Flexible Access Control Framework for Java Programs in Mobile Terminals", Proceeding of 22nd Int'l Conference on Distributed Computing Systems Workshops,(2002), pp. 777-782.

Trupin, J "The Visual Programmer", Microsoft Systems Journal,(Apr. 1996), pp. 103-105.

Usdin, Tommie et al., "XML: Not a Silver Bullet, But a Great Pipe Wrench", *Standard View* vol. 6, No. 3, (Sep. 2, 1998), pp. 125-132.

Varlamis, Iraklis et al., "Bridging XML-Schema and relational database. A System for generating and manipulating relational databases using valid XML documents", DocEng 01, ACM 1-58113-432-0/01/0011,(Nov. 9-10, 2001), pp. 105-114.

Williams, Sara et al., "The Component Object Model: A Technical Overview", Microsoft Corp,(Oct. 1994), pp. 1-14.

Wong, Raymond K., et al., "Managing and Querying Multi-Version XML Data with Update Logging", *DocEng '02*, (Nov. 8-9, 2002), 8 pages.

Zdonik, S "Object Management System Concepts", ACM,(1984), pp. 13-19.

"Notice of Allowance", U.S. Appl. No. 11/203,937, Supplemental,(Sep. 15, 2009),2 pages.

"Final Office Action", U.S. Appl. No. 10/942,528, (Sep. 17, 2009),27 pages.

"Non-Final Office Action", U.S. Appl. No. 11/107,347, (Sep. 17, 2009),9 pages.

"Notice of Allowance", U.S. Appl. No. 10/988,720, (Sep. 17, 2009),18 pages.

"Non-Final Office Action", U.S. Appl. No. 11/044,106, (Sep. 24, 2009),17 pages.

"Notice of Allowance", U.S. Appl. No. 11/203,937, (Aug. 31, 2009),2 pages.

"Non-Final Office Action", U.S. Appl. No. 11/567,149, (Sep. 08, 2009),5 pages.

"Final Office Action", U.S. Appl. No. 10/955,666, (Oct. 14, 2009),24 pages.

"Advisory Action", U.S. Appl. No. 10/942,528, (Oct. 26, 2009),3 pages.

"Non-Final Office Action", U.S. Appl. No. 11/557,931, (Oct. 20, 2009),27 pages.

"Non-Final Office Action", U.S. Appl. No. 10/976,451, (Oct. 29, 2009),14 pages.

Webopedia, "Definition of OLE", Retrieved from: <http://www.webopedia.com/TERM/O/OLE.html>, cited by examiner,(May 16, 1998),3 pages.

Webopedia, "Definition of OpenDoc", Retrieved from: <http://www.webopedia.com/TERM/O/OpenDoc.html>, cited by examiner,(Sep. 18, 1997),3 pages.

Webopedia, "Definition of Network", Retrieved from: <http://www.webopedia.com/TERM/n/network.html>, cited by examiner,(Sep. 1, 1996),2 pages.

"Notice of Allowance", U.S. Appl. No. 10/955,665, (Nov. 3, 2009),8 pages.

"Final Office Action", U.S. Appl. No. 11/072,087, (Nov. 16, 2009), 9 pages.

"Final Office Action", U.S. Appl. No. 11/218,149, (Nov. 16, 2009), 18 pages.

"Foreign Office Action", Mexican Patent Application No. Pa/a/2006/002493, (Sep. 14, 2009), 5 pages.

"Non-Final Office Action", U.S. Appl. No. 11/036,910, (Nov. 13, 2009), 9 pages.

"Notice of Allowance", U.S. Appl. No. 10/942,528, (Dec. 3, 2009), 8 pages.

"Notice of Allowance", U.S. Appl. No. 11/056,500, (Dec. 2, 2009), 17 pages.

"Notice of Allowance", U.S. Appl. No. 11/095,254, (Nov. 18, 2009), 8 pages.

Van Hoff, Arthur et al., "The Open Software Description Format", Retrieved from: <www.w3.org/TR/NOTE-OSD> on May 18, 2009, (Aug. 13, 1997), 10 pages.

"Final Office Action", U.S. Appl. No. 11/095,254, (Dec. 22, 2008), 9 pages.

"Final Office Action", U.S. Appl. No. 11/107,347, (Mar. 22, 2010), 11 pages.

"Non-Final Office Action", U.S. Appl. No. 11/095,254, (Apr. 17, 2008), 8 pages.

"Restriction Requirement", U.S. Appl. No. 11/095,254, (Nov. 1, 2007), 8 pages.

"Non-Final Office Action", U.S. Appl. No. 10/976,451, (Apr. 9, 2010), 11 pages.

"Supplemental Notice of Allowance", U.S. Appl. No. 11/072,087, (Apr. 19, 2010), 2 pages.

"Supplemental Notice of Allowance", U.S. Appl. No. 10/990,152, (Apr. 19, 2010), 2 pages.

"Non-Final Office Action", U.S. Appl. No. 10/402,640, (Apr. 30, 2010), 4 pages.

"Non-Final Office Action", U.S. Appl. No. 11/107,347, (Jul. 9, 2010), 16 pages.

"Foreign Office Action", European Patent Application No. 01939368.5, (Feb. 25, 2010), 3 pages.

"Final Office Action", U.S. Appl. No. 11/036,910, (May 26, 2010), 9 pages.

"Final Office Action", U.S. Appl. No. 11/170,521, (Jun. 29, 2010), 13 pages.

"Final Office Action", U.S. Appl. No. 11/218,149, (May 19, 2010), 17 pages.

"Foreign Office Action", Australian Application No. 2006200285, (May 20, 2010), 2 pages.

"Foreign Office Action", Russian Application No. 2006103267, (Apr. 20, 2010), 10 pages.

"Foreign Office Action", Russian Application No. 2006105526, (Apr. 15, 2010), 10 pages.

"Non-Final Office Action", U.S. Appl. No. 11/295,178, (May 26, 2010), 45 pages.

"Non-Final Office Action", U.S. Appl. No. 11/567,140, (May 18, 2010), 8 pages.

"Notice of Allowance", U.S. Appl. No. 10/402,640, (Jun. 15, 2010), 6 pages.

"Notice of Allowance", U.S. Appl. No. 11/557,931, (May 5, 2010), 7 pages.

"Notice of Allowance", U.S. Appl. No. 11/872,703, (May 14, 2010), 18 pages.

"Supplemental Notice of Allowance", U.S. Appl. No. 11/044,106, (May 13, 2010), 6 pages.

"Supplemental Notice of Allowance", U.S. Appl. No. 11/044,106, (May 19, 2010), 5 pages.

"Foreign Office Action", European Patent Application No. 01939368.5, (Feb. 25, 2010), 3 pages.

* cited by examiner

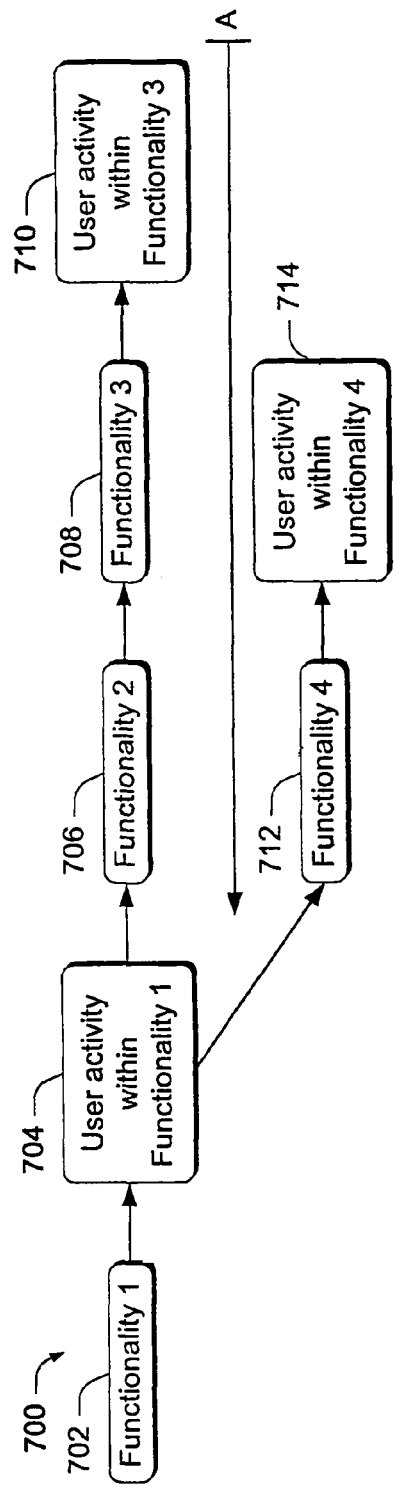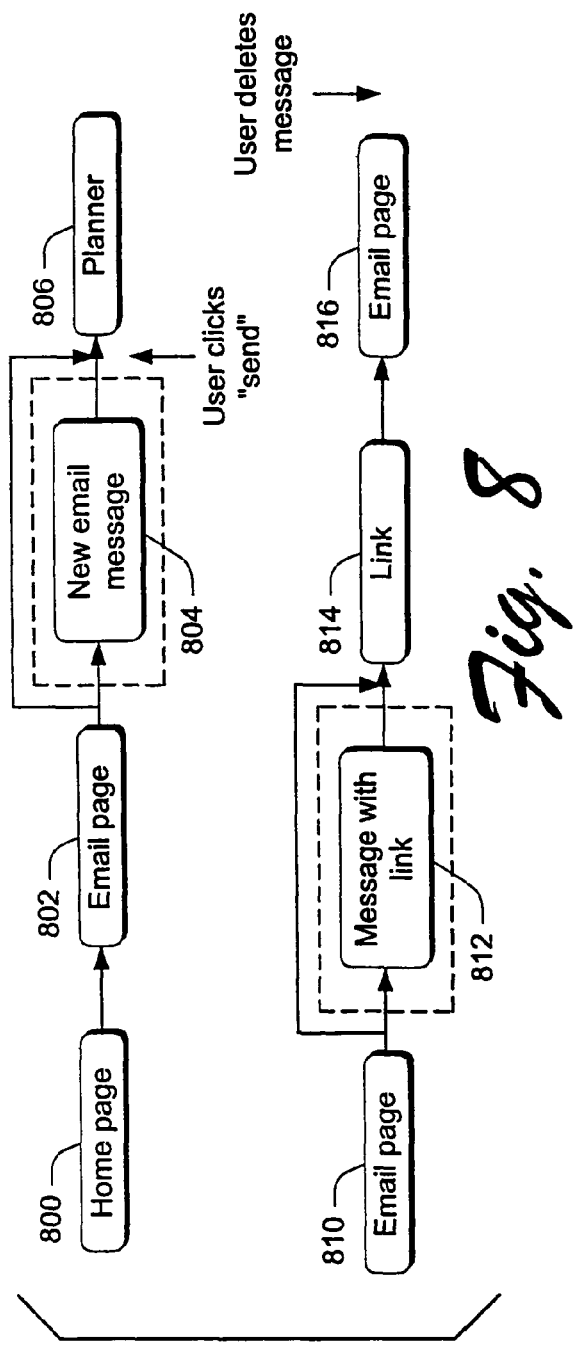

SINGLE WINDOW NAVIGATION METHODS AND SYSTEMS

RELATED APPLICATIONS

This application is a continuation of and claims priority to U.S. patent application Ser. No. 09/599,298, filed on Jun. 21, 2000, the disclosure of which is incorporated by reference herein.

The following patent applications are related to the present application, are assigned to the assignee of this patent application, and are expressly incorporated by reference herein:

U.S. patent application Ser. No. 09/599,806, entitled "Methods and Systems of Providing Information to Computer Users", and filed on the same date as this patent application;

U.S. patent application Ser. No. 09/599,299, entitled "Methods, Systems, Architectures and Data Structures For Delivering Software via a Network", and filed on the same date as this patent application;

U.S. patent application Ser. No. 09/599,048, entitled "Network-based Software Extensions", and filed on the same date as this patent application;

U.S. patent application Ser. No. 09/599,813, entitled "Authoring Arbitrary XML Documents using DHTML and XSLT", and filed on the same date as this patent application;

U.S. patent application Ser. No. 09/599,812, entitled "Architectures For And Methods Of Providing Network-based Software Extensions", and filed on the same date as this patent application.

U.S. patent application Ser. No. 09/599,086, entitled "Task Sensitive Methods And Systems For Displaying Command Sets", and filed on the same date as this patent application.

TECHNICAL FIELD

This invention relates generally to computing systems and methods, and more particularly concerns systems and methods that facilitate creation and use of information within a computing environment.

BACKGROUND

The current popular paradigm in software application design is to provide a separate and oftentimes different window for each application that might be executing on a computing device. When a user desires to use a particular application, they will typically open up the application which will then be presented by the computer system in the form of a window or windows that allows the user to interact with the application. For example, a word processing application (such as Microsoft Word) will typically be displayed in a window that has an area for a user to create a document or retrieve and edit a document that is already in existence. If a user wishes to read their email, then they will typically open up an email application (such as Microsoft Outlook) which will typically be displayed in another window that is separate and different from the word processing window. Now, the user has two windows to manage—a word processing window and an email window.

Traditionally, a user has managed multiple windows through the use of a task bar that is, many times, located at the bottom portion of a user display. The task bar is a very thin bar that can extend across a good portion of the user's display and includes references to applications or documents that the user is using or has used. The user can "minimize" the email window when, for example, they wish to work inside the word processing application. When the email window is minimized, a reference to the email application is placed in the task bar. If the user receives an email during the course of working in the word processing application, they can restore the email window by clicking on the reference to the email application in their task bar. This restores the email application so that the user can interact with and read their email. In the course of reading an email message, the message is likely to be presented in yet another window. If the user chooses to respond to the email message, they typically prepare their response in a "reply" window which is yet a fourth window that the user must manage.

The above-described scenario constitutes a simple example of a window management scenario when the user has opened only two applications. Consider the case where a user has multiple applications (e.g. four or more) that they are working in throughout the day. As a specific example, consider the following four exemplary applications that a user might find necessary to use during the course of their computing day: a word processing application, a presentation application (such as Microsoft Powerpoint), a web browser application (such as Microsoft Internet Explorer), and an email application.

What many users typically do is they open all of the applications and then manage each application's separate and different window as they need access to a different application. The application managing part of the screen uses what is referred to as a "windowing environment." Yet, windowing environments are not necessarily intuitive to all potential computer users. User studies have consistently shown that one of the biggest hurdles for new users of a windowing environment is learning to understand a windowing system, where windows can "layer" on top of each other. Consider, for example, FIG. 1 which shows an exemplary user display 10 that includes four exemplary windows 12, 14, 16, 18, respectively dedicated to a word processor application, a presentation application, a web browser application, and an email application. These windows are layered on top of one another which, for a new computer user, can be a difficult concept to understand and manage. For example, some users might not understand how to use a task bar to manage the windows. They might, for example, inadvertently close an application when they simply intended to minimize it. Additionally, the users might not appreciate or understand how to move the separate windows around on their display. Further, different windows can sometimes be inadvertently clicked by a user. For example, while a user is in a window associated with one application, they may inadvertently click the edge of a window associated with another application, whereupon they find themselves in the middle of a different application. Finally, many users simply do not comprehend that their screen has multiple layers: they only think of the top window as the one that they can interact with, as if the previous ones were lost.

Windowing environments, however, do not just pose challenges to newer computer users: they can sometimes pose challenges to users who are familiar with such environments. Specifically, management of multiple windows can be distracting to computer users, particularly when a user has many different windows that they are attempting to manage. For example, if a user has many different applications that they are executing that are being managed by a task bar at the bottom of the user's display, to switch from one application to another, the user must find the appropriate task bar portion that references an application of interest. The user must then click on the task bar portion to pull up the application. This scenario can be complicated if, for example, the user has multiple documents in one application that have been minimized, e.g. multiple word processing documents or multiple email messages that they might intend to respond to during the course of their day. This complicates the scenario because now the task bar must maintain an entry for not only each of the user's applications, but each of the documents within each application that might have been minimized by the user as well. At this point, accessing the minimized applications or document is not an easy task, but rather has devolved into a trial and error hunting process. This is not an efficient way for busy users to manage their applications and documents.

Accordingly, this invention arose out of concerns associated with improving the efficiencies with which a computer user interacts with their computer.

SUMMARY

In one embodiment, a single navigable window is provided and can be is navigated by a user to and between different functionalities. A functionality is analogous to an application program. The different functionalities enable a user to accomplish different tasks, e.g. word processing tasks, email tasks, calendar tasks and the like. The single navigable window and the functionalities to which it can be navigated are advantageously provided by a single application that, in turn, provides a very high degree of integration between the functionalities.

In the described embodiment, a user is presented with a user interface (UI) that contains both the single window and navigation instrumentalities that allow the user to navigate between the different functionalities. Exemplary navigation instrumentalities include links associated with each functionality that can be clicked on by a user to access a particular functionality. As the user clicks on various links and engages in different activities within the functionalities, a navigation model maintains a "travel log" of where the user has been so that the user can return to various functionalities to complete tasks or initiate new tasks. In one implementation the travel log is implemented in the form of a navigation stack that utilizes a "back and truncate" model. Advantageously, another of the exemplary navigation instrumentalities comprises browser-like navigation buttons in the form of a navigation bar that includes "back" and "forward" buttons. By clicking on these buttons, a user can move between functionalities and activities within various functionalities. Various novel navigation model manipulations can be performed to ensure that the user's context is logically maintained. These manipulations include adding, removing, and reorganizing entries.

In one advantageous implementation, context-sensitive commands are automatically presented to a user as they navigate to and between the various functionalities. The context-sensitive commands typically change as the user changes functionalities so that the user always has the correct contextual commands to select from in their currently selected functionality.

In one exemplary embodiment, the functionalities that are available pertain to so-called document-centric functionalities such as word processing functionalities, email functionalities, planner functionalities, web browser functionalities, and the like—all provided within the context of a single application. That is, the functionalities in some way implicate documents that the user is able to browse and/or edit.

In the document-centric embodiment, the documents have properties among which is a document mode. Document modes constrain the way that users interact with documents. Two exemplary modes are "browse mode" and "edit mode". The browse mode allows a user to only view a document and not edit its contents, e.g. a Web page. The edit mode allows a user to edit or change a document, e.g. a word processing document. These modes impact management of the navigation model (i.e. navigation stack) and various inventive measures are taken to ensure that any impact user actions have on the navigation model are accounted for so that the user's navigation activities bear a logical correspondence with their actions.

In the document-centric embodiment, the user can author different types of documents by navigating the single window to a blank document of a particular type, and then authoring the document in an appropriate manner. The authored document can then be automatically published by the system in the appropriate manner (e.g. saved to a particular collection in the event of a free-form document, transmitted to a recipient in the event of an email message etc.). One particularly advantageous feature of the document-centric single navigable window is that it natively understands and can view different types of document collections. By navigating the window to a particular document collection, the user can select individual documents of the corresponding type and operate upon them in some manner.

In one embodiment, an extensible software platform is provided and serves as a basis to incorporate or integrate different "functionalities" into the single application program that provides the single navigable window. That is, both individual functionalities and the main application itself are extensible.

In one particularly advantageous embodiment, access to functionalities in accordance with the single navigable window application is provided via a network such as the Internet. This provides one basis for a subscriber model service in which the functionalities can be packaged and offered for sale to various subscribers.

BRIEF DESCRIPTION OF THE DRAWINGS

FIG. 4 is an exemplary specific user interface that is displaying one exemplary document-centric functionality in accordance with an example illustrating the described embodiment.

FIG. 5 is an exemplary specific user interface that is displaying one exemplary document-centric functionality in accordance with an example illustrating the described embodiment.

FIG. 7 is a block diagram that illustrates an exemplary navigation model in the form of a navigation stack that implements a "back-and-truncate" model.

FIG. 8 is a block diagram that illustrates an exemplary navigation model in the form of a navigation stack, and visually demonstrates one inventive navigation stack manipulation in accordance with the described embodiment.

DETAILED DESCRIPTION

Overview

The embodiments described just below provide improved methods and systems for creating and using information in a computing environment. The inventive methods and systems address, among other things, user issues relating to computing in a multi-window environment as discussed above.

The inventive methods and systems provide a single navigable window that can be used by a user to navigate to and between multiple different functionalities that are provided by a single application program. By "single navigable window" is meant that users can move from one functionality to another, and within functionalities, all within one window, and then can move back and forth between previously-visited functionalities in a session in a prescribed order based on the order they visited those places. The functionalities enable the user to complete different tasks, and the single window enables the user to navigate between functionalities, and hence tasks, in a seamless manner. By having only one window, the user is relieved of the duties of managing multiple windows. By having all of the functionalities presented within a single application, the user is provided with a highly integrated software product that greatly improves the user's computing experience. Exemplary functionalities are described in the context of document-centric functionalities such as word processing and email functionalities.

The inventive methods and systems make novel use of a navigation model that manages the user's navigation activities to and between the different functionalities. The described navigation model is a navigation stack that conforms generally to a "back-and-truncate" model.

Navigation instrumentalities are provided and enable the user to navigate among the different functionalities. In the described embodiment these navigation instrumentalities include, without limitation, links to each of the different functionalities as well as browser-like navigation buttons.

Context-sensitive command sets can also be provided in a user interface along with the single navigable window. The context sensitive command sets include commands that automatically change as the user's computing context changes, e.g. as the user moves from functionality to functionality.

In one embodiment, the single application is defined as a software platform that is extensible to receive and incorporate different functionalities. The functionalities can be provided as software modules that can be sent over a network such as the Internet. The extensible software platform provides a basis to offer a subscriber or fee-based service where different subscribers can, for a fee, access different functionalities via a network such as the Internet.

Exemplary Computer System

Figure 1:
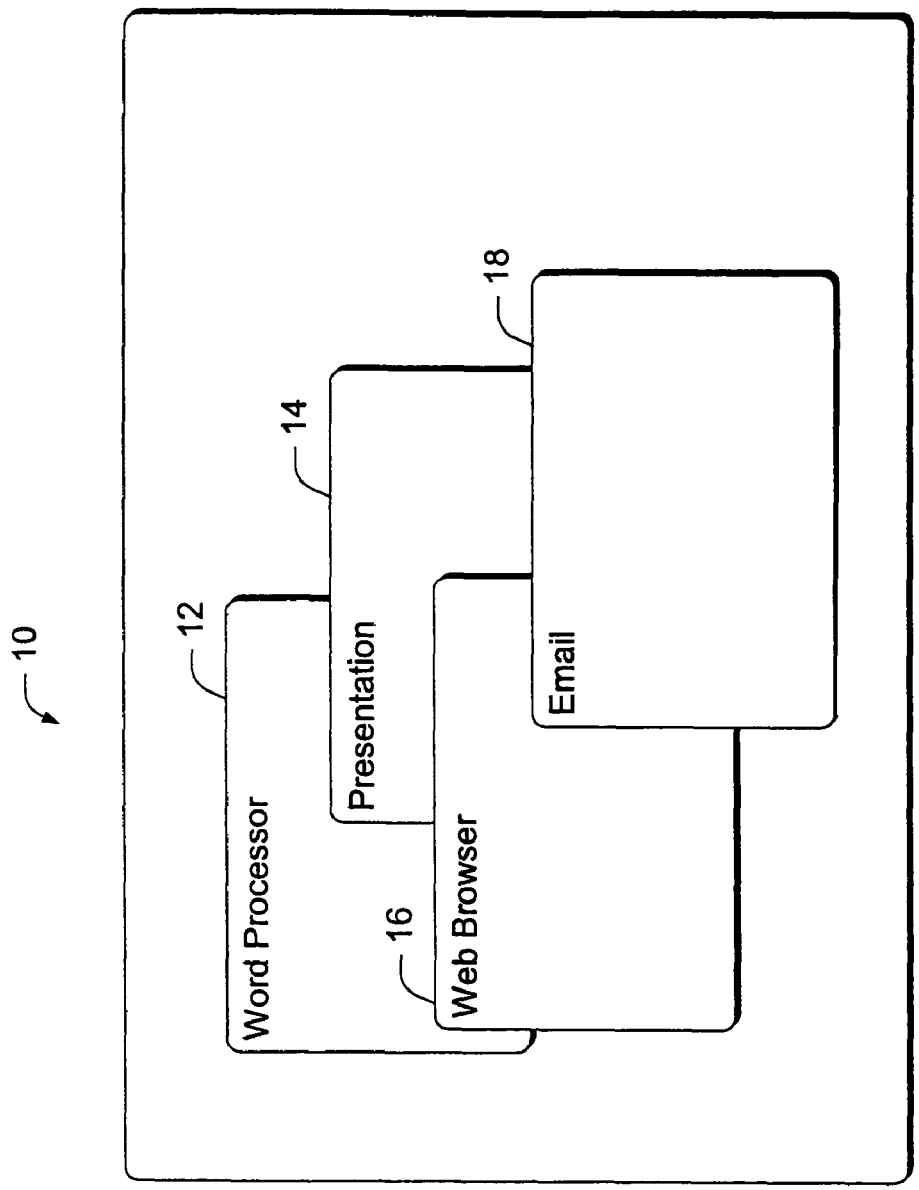
FIG. 1 is an exemplary display offered by a windowing environment in accordance with the prior art.
Figure 2:
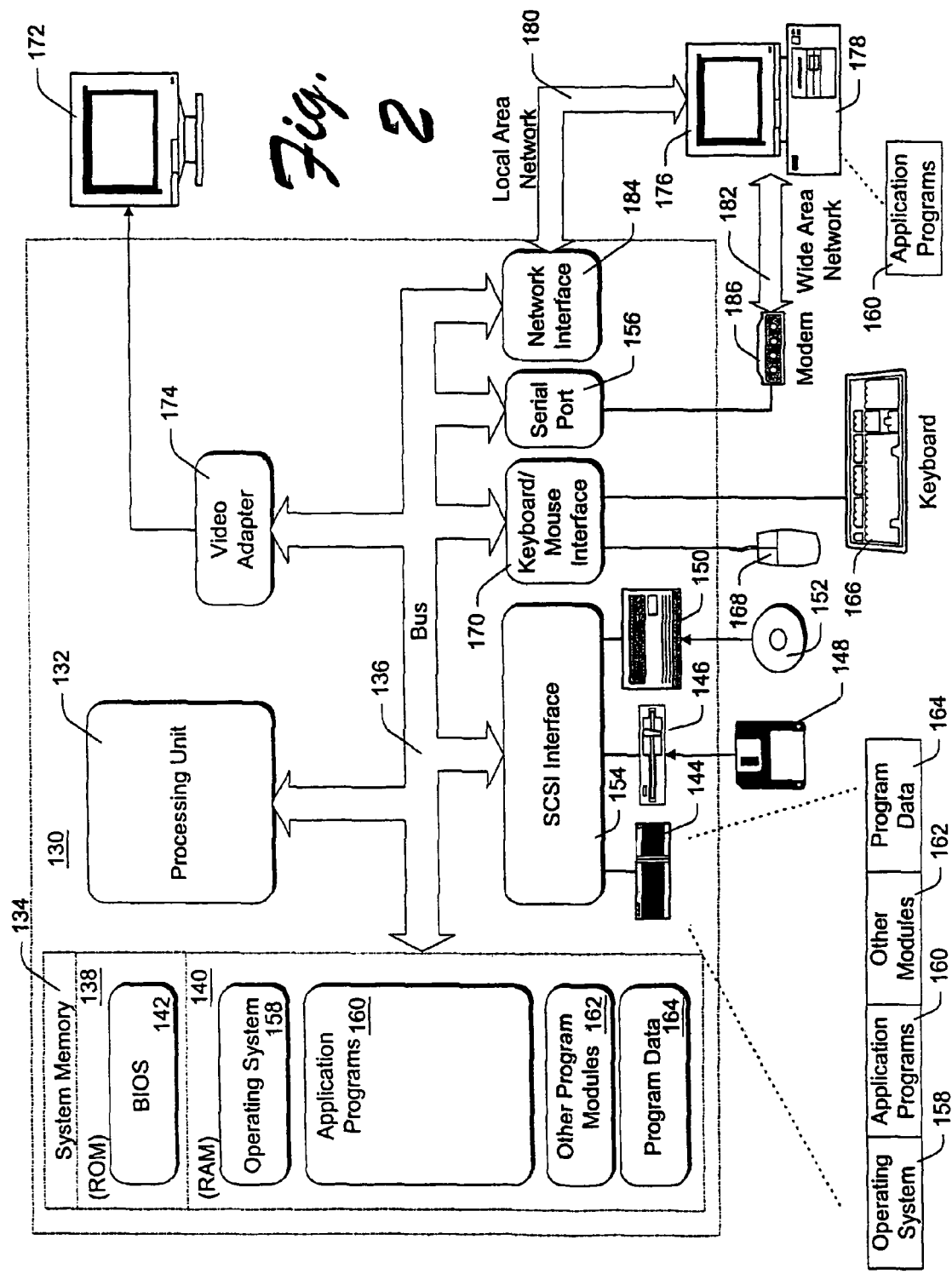
FIG. 2 is a high level block diagram of an exemplary computing system that is suitable for implementing the described embodiments.

FIG. 2 shows an exemplary computer system that can be used to implement the embodiments described herein. Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 2. The logical connections depicted in FIG. 2 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Single Navigable Window

In accordance with one embodiment, software provides a user interface (UI) that presents a user with a single navigable window that can be navigated from functionality to functionality and inside individual functionalities by a user. The user interface enables the user to effectively manage multiple windows, and hence multiple functionalities, by presenting only one window at a time. This is different from the traditional windowing environment because the windows that pertain to the individual functionalities are not layered on one another and do not need separate management. Another noteworthy way that the single navigable window varies from the traditional windowing environment is that the various functionalities are provided by a single application. That is, in the traditional windowing environment, it is very typical for multiple windows to be provided by multiple different applications that are opened by a user, e.g. a word processing application will have one window, an email application will have another window, a web browsing application will have another window, and the like. All of these windows are separate and requirement separate management by the user. In the present case, various functionalities that were once the domain of individual separate applications are now the domain of a single integrated application which provides its own window management scheme. The window management scheme is embodied in the form of a single navigable window that can be navigated by a user from functionality to functionality.

A user, through the use of navigation instrumentalities can navigate between the functionalities and when doing so, the single window ensures that only one of these functionalities is presented to a user at a time. In the described embodiment, one navigation instrumentality is provided in the form of a web browser-like navigation tool. The choice of a web browser-like navigation tool follows from concerns that navigation instrumentalities be of a type that is readily understood by most individuals familiar with computing environments. Thus, when a user first encounters the inventive navigable single window concept for the first time, they do not have to learn an unfamiliar navigation concept. Another navigation instrumentality includes links to each of the multiple different functionalities. These links can be clicked on by a user and the single navigable window is automatically navigated to the selected functionality.

Figure 3:
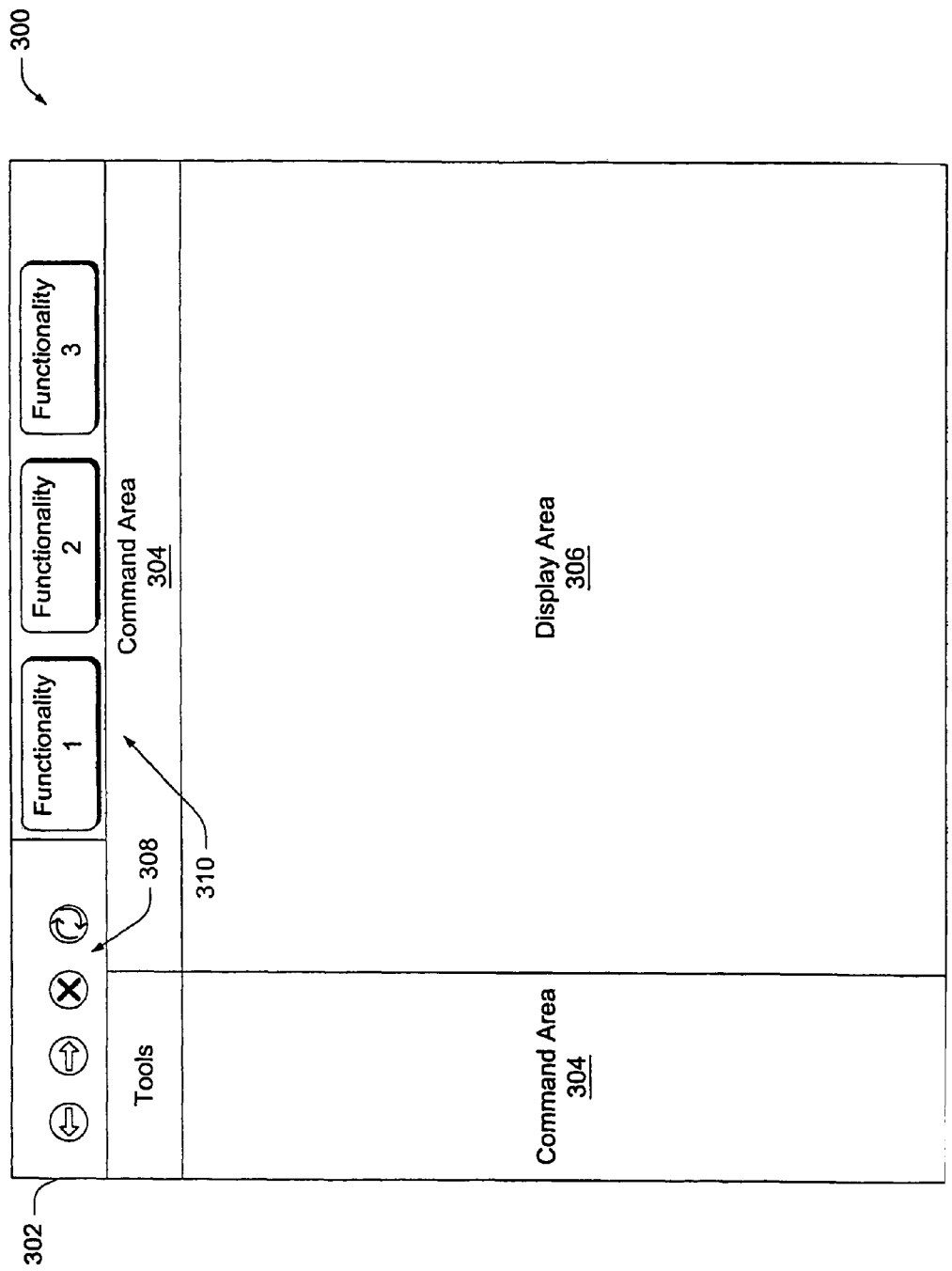
FIG. 3 is an exemplary user interface (UI) in accordance with one described embodiment.

FIG. 3 shows but one exemplary user interface (UI) 300 in accordance with one described embodiment. It will be appreciated that other UIs could be used to implement the inventive concepts described herein and that the illustrated UI constitutes but one way of doing so. In the illustrated example, UI 300 includes a navigation bar 302, one or more command areas 304, and a display or document area 306 that constitutes the single navigable window.

Navigation bar 302 is located adjacent the top of display area 306 and contains browser-like navigation buttons 308 in the form of a "backward" button, a "forward" button, a "stop" button and the like. The navigation bar can be located anywhere on the UI. Its illustrated placement, however, is similar in appearance to the placement of traditional web browsing navigation features. In addition to the navigation buttons 308, the navigation bar 302 also includes links 310 to the different functionalities that can be accessed by the user. In the illustrated example, links to three exemplary functionalities (i.e. functionality 1, functionality 2, and functionality 3) are shown. These functionalities are typically different functionalities that can enable a user to complete different respective tasks. Examples of different tasks are given below in more detail. These functionalities are all provided within the context of a single application. To access a particular functionality, a user simply clicks on one of the links and a window that pertains to the selected functionality is immediately presented in the display area 306.

Command areas 304 are located adjacent the top and left side of the display area 306. The command area(s) can, however, be located in any suitable location. The command areas provide commands that are both global in nature and specific to the particular context the user has selected. For example, some commands such as "search" and "help" might be considered as global in nature since they can find use in many contexts. Other commands, such as "text bold" or "forward" are more specific to the particular context that the user has selected. For the "text bold" command, the user's context may likely be a word processing context, while the "forward" command may likely be employed in an email context. The concept of context-sensitive command structures are described in more detail in the U.S. Patent Application entitled "Task Sensitive Methods And Systems For Displaying Command Sets", incorporated by reference above.

Example

Figure 4:
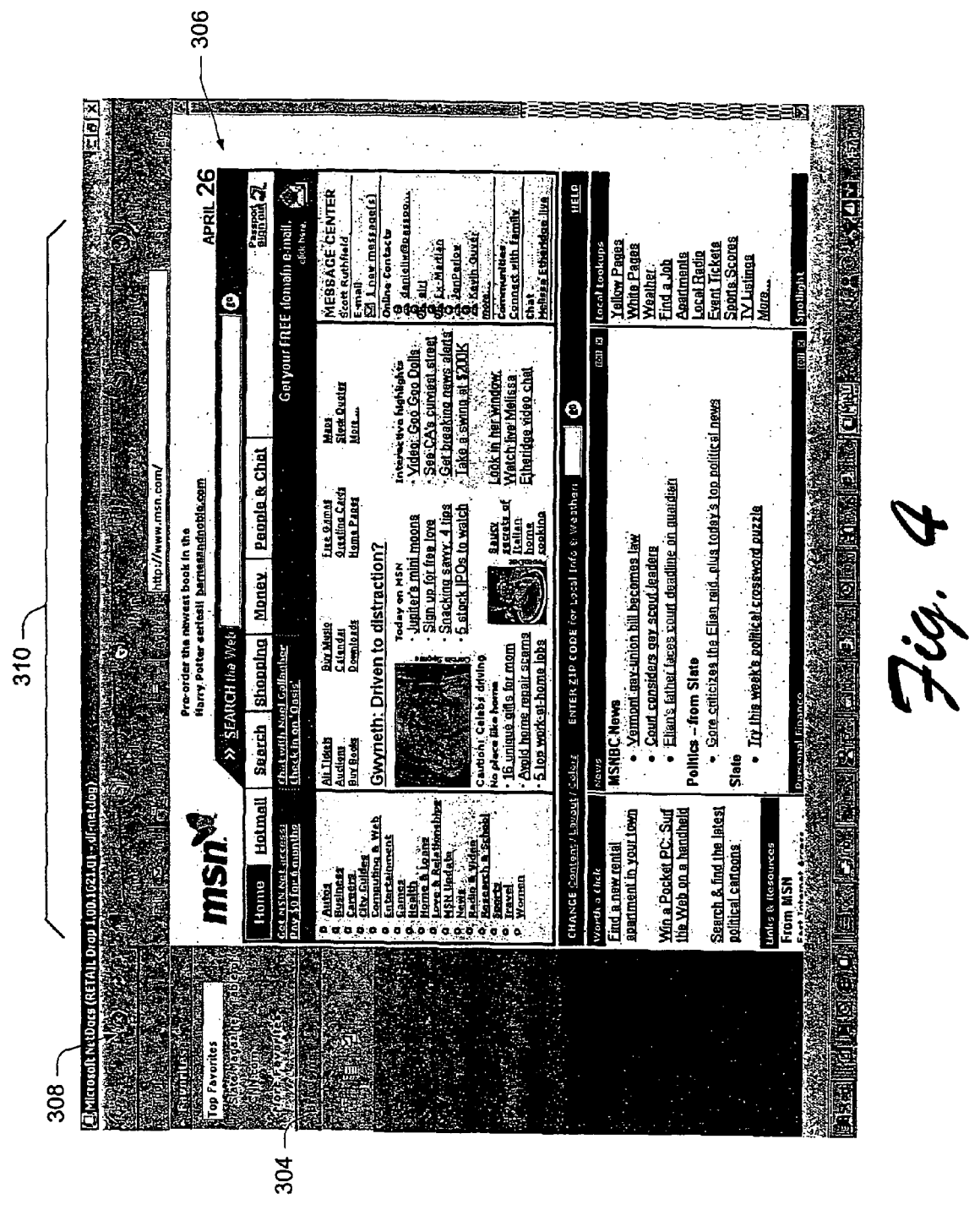
Figure 5:
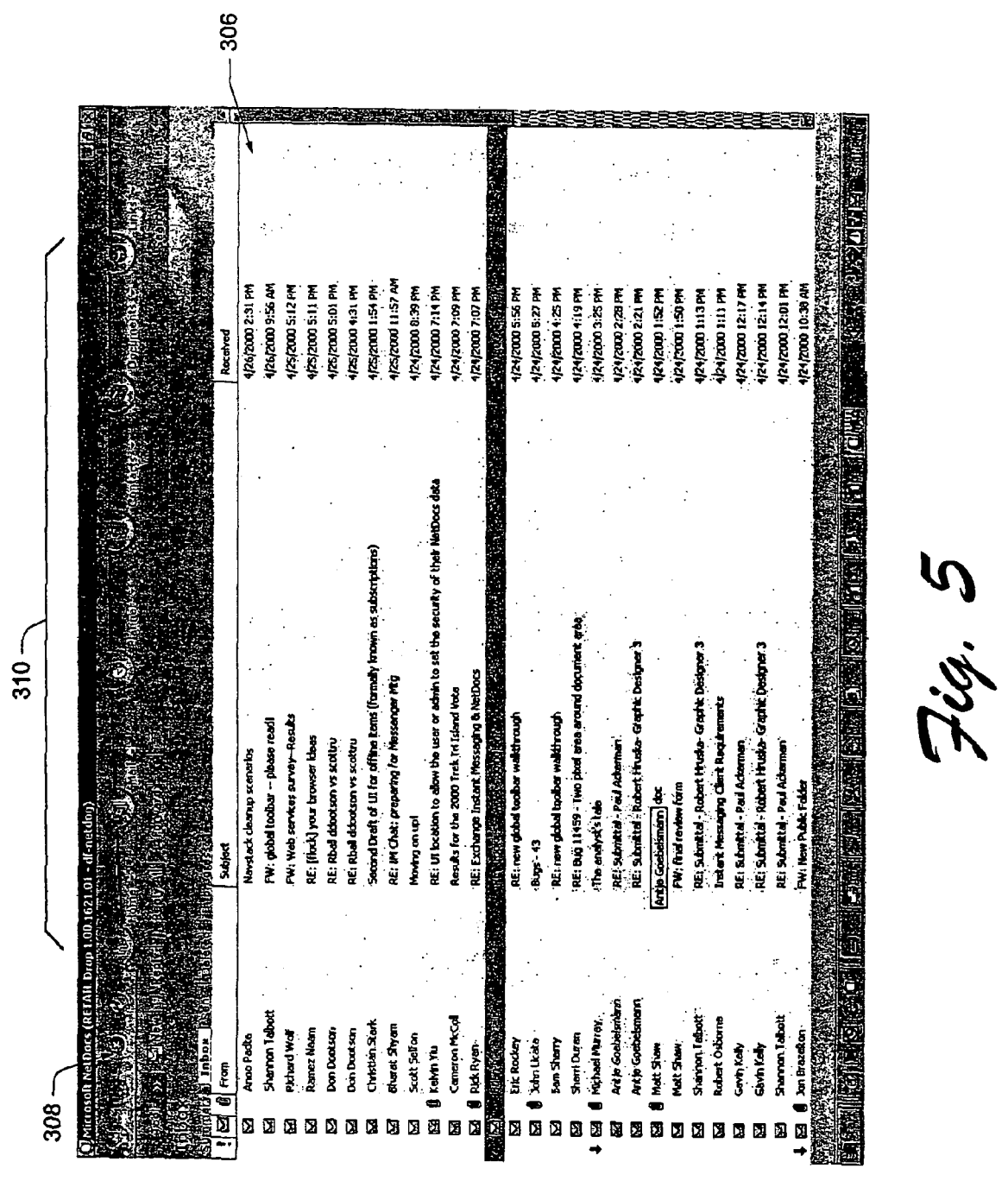

As an example of the single navigable window provided by a single application consider FIGS. 4 and 5.

In this example, the multiple functionalities 310 that can be navigated by a user include a browser functionality (indicated by the home icon), a mail functionality (indicated by the letter icon), a planner functionality (indicated by the clock icon), a contacts functionality (indicated by the people icon), a documents functionality (indicated by the folder icon), and a links functionality (indicated by the world icon). These functionalities are so-called "document-centric" functionalities because they all relate in some way to a document that a user interacts with, e.g. a Web page document, an email document, a calendar document, etc.

FIG. 4 shows an example of a display that is rendered in the display area 306 when a user clicks on the link to the browser functionality. By clicking on the link (i.e. the home icon) to the browser functionality, single application program software executing on the user's computer executes to implement a browser functionality. In this example, the browser functionality displays the user's home page in display area 306.

Notice also that navigation buttons 308 are provided for navigation between the different selectable functionalities. The command areas 304 contain command sets that include commands that are specific to the context that the user has selected. In this example, the user's context is a browsing context. Accordingly, the leftmost command area contains commands that are specific to the browsing functionality. Such commands include ones that a user would normally expect to find in a web browser. Notice also that the command area 304 adjacent the top of display area 306 also contains commands that are specific to the browsing context, i.e. "Add to Favorites" and an address well in which the user can type a URL of a particular destination web site.

FIG. 5 shows an example of a display that is rendered in the display area 306 when the user clicks on the link to the mail functionality (i.e. the folder icon). By clicking on this link, single application program software executing on the user's computer executes to implement the mail functionality. In this example, the mail functionality displays a user's in box with messages that have been received by the user. Notice that the leftmost command area has been minimized by the user and that the command area adjacent the top of the display area 306 contains commands that are specific to the user's current context, e.g. "New" for generating a new email message, "Reply" for replying to an email message, "Reply to All" for replying to all recipients of an email message and the like.

Likewise, although not specifically illustrated, the user could have displays for the planner, contacts, documents, and links functionalities presented in the display area 306 by simply clicking on the links to these specific functionalities. The navigation bar 308 provides the user with the ability to navigate through these different functionalities in a browser-like manner.

It is important to note that the above example constitutes but one exemplary way in which multiple different functionalities can be presented to a user within the construct of a navigable structure. It should be understood that the specifically illustrated functionalities (i.e. browser, mail, planner etc.) constitute specific examples of different functionalities that are capable of being incorporated into the single application program that provides the navigable window. Accordingly, other different functionalities can be employed. This aspect is discussed in more detail in the section entitled "Extensible Functionalities" below.

Figure 6:
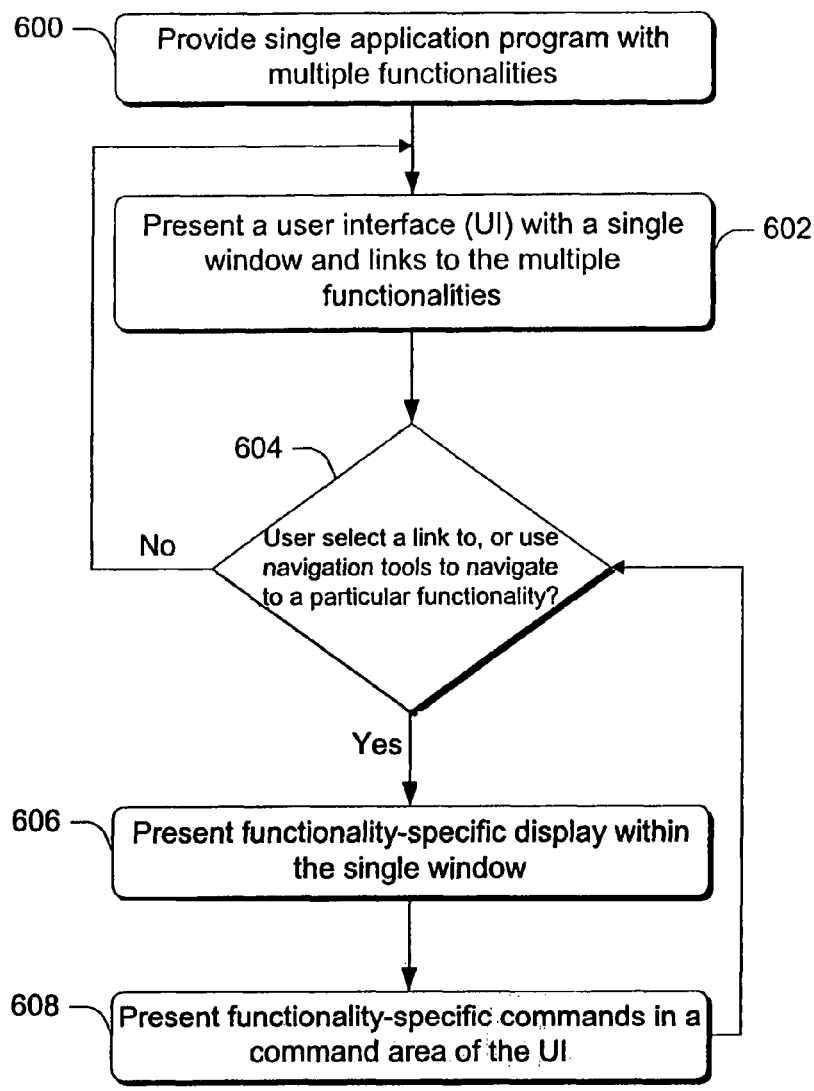
FIG. 6 is a flow diagram that describes steps in a method in accordance with the described embodiment.

FIG. 6 is a flow diagram that describes steps in a method in accordance with the described embodiment. The illustrated method can be implemented in any suitable hardware, software, firmware, or combination thereof. In the illustrated example, the method is implemented in software.

Step 600 provides a single application program with multiple different functionalities. The functionalities, as pointed out above, are advantageously different so as to enable a user to accomplish different tasks. One specific non-limiting example of different functionalities was given above in the context of document-centric functionalities that enable a user to make use of browser, mail, planner, contacts, documents, and links functionalities. Step 600 can be implemented by configuring a computing device, such as a user's computer, with the single application program having the multiple different functionalities. As will be seen in various sections below, this step can also be implemented by providing a software platform in the form of a generic single application shell that is extensible and adaptable to receive different extensions or software modules that embody various different functionalities. These different extensions are then presented to the user in the context of the single application having the multiple different functionalities.

These extensions, as described below, can be delivered to the platform in any suitable way and through any suitable delivery mechanism. For example, one way of delivering the various extensions or functionalities is to deliver them via a network such as an Intranet or the Internet. Regardless of the manner in which the single application is provided, step 602 presents a user interface (UI) with a single window and links to the multiple different functionalities. The UI can also advantageously include navigation instrumentalities that enable a user to navigate between the different functionalities in a browser-like manner. FIGS. 3-5 give specific examples of an exemplary UI that can be used in accordance with the described embodiment. Step 604 ascertains whether a user has selected a particular link to a functionality or whether the user has used one of the navigation instrumentalities to navigate to a particular functionality. If a user has not done either, the method branches back to step 602. If, on the other hand, a user has selected a particular link or used a navigation tool to navigate to a particular functionality, step 606 presents a functionality-specific display within the single window. That is, the single navigable window is navigated by the software to the selected functionality. Specific examples of this were given above in connection with FIGS. 4 and 5 in which browsing and mail functionalities were respectively displayed within display area 306. In connection with presenting the functionality-specific display in step 606, step 608 can present functionality-specific commands in a command area of the UI. This is advantageously done automatically as a user navigates from functionality to functionality. That is, as a user changes functionalities, command sets that are specific to the user's current context or functionality are automatically displayed in the command area. Step 608 then branches back to step 604 to ascertain whether the user has navigated to another functionality.

Hence, in the above example, a single application comprises multiple functionalities that enable a user to accomplish different tasks. These multiple functionalities are presented in the context of a single window that is navigable by a user between the different functionalities. Advantageously, navigation instrumentalities are provided that are, in some instances, browser-like in appearance (although not necessarily in behavior, as will be discussed below) and allow the user to navigate between the application-provided functionalities in a browser-like manner. Functionality-specific commands can be automatically presented to the user when they navigate to a particular functionality.

Navigation Model

In the described embodiment, a navigation model is utilized to manage a user's navigation activities within the single application that provides the multiple different functionalities. Although any suitable navigation model can be used, in the described embodiment a so-called "back-and-truncate" navigation stack is used. The basic concept of a back-and-truncate model is known and forms the basis for many different web browsers on the market today. Essentially, the back-and-truncate model makes use of a navigation stack that is truncated when the user navigates back n times and then forward to a new document.

Consider, for example, FIG. 7 which illustrates how an exemplary navigation stack works in connection with the described embodiment. Essentially, when a user is presented with the single application UI, they can select links from different areas. First, they might select a push button link (e.g. 310 in FIG. 3) from the navigation bar; second, they might use the forward and back buttons 308; third, they might select a link that is display in the display area 306 (e.g. when in the browsing functionality, there may be links to different web pages that the user can select). As the user makes their way about the various functionalities and selectable links, a navigation stack is built and maintained. In the described embodiment, the navigation stack is maintained in memory, but could easily be maintained in a store to preserve the user's navigation stack for future sessions.

In the FIG. 7 example, a first navigation stack 700 can be established as follows: a user initiates the single window application and is presented with a UI such as the one shown in FIG. 3. From there, a user may click on a link to the first functionality which establishes a first entry 702 in the navigation stack. While engaging the first functionality the user may take part in a certain activity which results in a new display being presented in the display area 306 (FIG. 3). Accordingly, a second entry 704 appears in the navigation stack 700. As the user navigates from functionality to functionality (and takes part in activities within the functionalities) the navigation stack grows and shrinks in accordance with the exemplary employed back-and-truncate model. This might result in the illustrated entries 706, 708, 710. Assume now that the user employs the "back" button in the navigation bar to move back through the navigation stack. This action is illustrated by arrow A in FIG. 7. When the user arrives at entry 704 in the navigation stack, they click on a different link that navigates their window to functionality 4 (entry 712 in the navigation stack). At this point, the user has moved back through the navigation stack and the stack has been truncated to include only entries 702, 704, and 712. From functionality 4, the user takes part in an activity that presents a display that results in entry 714 in the navigation stack. The above example essentially illustrates the functionality of a back-and-truncate navigation model. In the inventive systems and methods, improvements on this model are made to ensure that the user's navigation experience is logically consistent with actions that the user can engage in.

As an example, the inventive systems and methods provide for navigation stack operations and manipulations that are not found in the typical contemporary navigation models. Specifically, in the present case, the navigation stack can be manipulated to delete, add, and modify navigation stack entries to ensure that consistency is maintained. Consider the following elementary example. Assume that the single window navigation system is employed in the context of functionalities that include the ones described above in connection with FIGS. 4 and 5. Assume also that a user navigates from their home page to the email functionality and clicks the "new" button to author a new email message. At this point, the navigation stack will contain entries that look like those in FIG. 8 at 800, 802, and 804. Assume now that the user clicks the "send" button to send the email message to the recipient and then navigates to their planner functionality as indicated by entry 806. Now assume that the user navigates backward through the navigation stack using their "back" button. If the navigation stack were not manipulated at all, then when the user navigated back to the new email message 804 (which was sent and is physically and logically no longer present), the user would likely receive an error message because the document corresponding to that navigation stack entry is no longer available. Instead, the inventive systems and methods ensure that consistency is maintained by removing the entry 804 and reorganizing the navigation stack so that the entry preceding entry 806 is now entry 802.

Consider another example with reference to FIG. 8. Assume that a user navigates to their email functionality and reads a message that contains a browser link to a web page. Assume also that they click on the browser link which navigates their single window to the web page. The navigation stack will thus contain entries that look like those in FIG. 8 at 810, 812, and 814. Assume now that the user wishes to send an email message to the sender of their original message, but rather than navigating back through the navigation stack by using the "back" button, they simply click the mail link in their navigation bar and thus add entry 816 to the navigation stack. Assume now, while at the email functionality the user decides to delete the mail message that contained the browser link. When the user deletes the email message corresponding to entry 812, the software checks the navigation stack and removes the appropriate entry corresponding to the deleted message, i.e. entry 812. The software then reorganizes the navigation stack so that entry 810 leads to entry 814 and vice versa.

The above examples illustrate an important characteristic of some of the inventive navigation model manipulation operations that distinguish them from ordinary back-and-truncate operations. For example, here, manipulation of the navigation model, i.e. removing entries, adding entries and reorganizing entries takes place in response to user actions that are not necessarily navigation activities, i.e. the user moving to or between functionalities. Rather, the user's actions that result in the navigation stack manipulations in these examples constitute actions that are supported inherently by the various functionality to which the user has happened to navigate. These user actions necessarily impact the logical association of entries in the navigation model. Without the inventive navigation model manipulation operations, there is a high degree of likelihood that the single navigable window interface would present the user with a degraded experience that is logically inconsistent with the user's navigation activities and/or actions within a particular functionality, e.g. by presenting the user with a logically non-existent document when the user navigates backward in the illustrated navigation stack.

Figure 9:
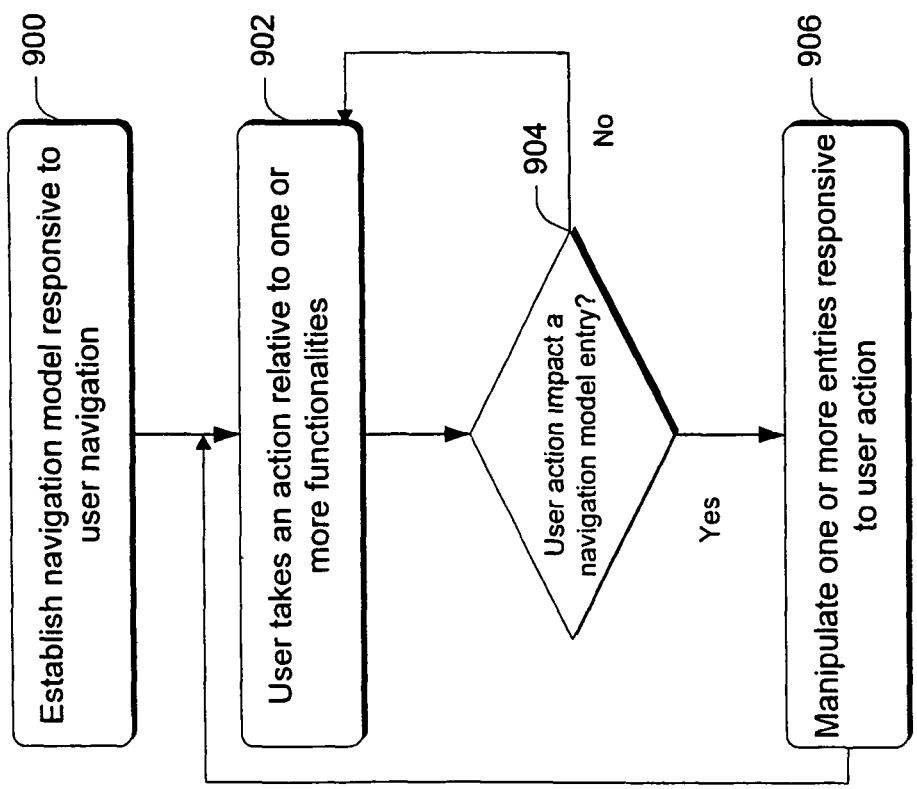
FIG. 9 is a flow diagram that describes steps in a method in accordance with the described embodiment.

FIG. 9 is a flow diagram that describes steps in a navigation model management method in accordance with the described embodiment. The described method can be implemented in any suitable hardware, software, firmware or combination thereof. In the present example, the method is advantageously implemented in software in connection with a single application that contains multiple functionalities that can be navigated using a single navigable window as described above.

Step 900 establishes a navigation model responsive to user navigation activities. In the example given above, the navigation model is established in memory and manages the user's navigation activities as they navigate from functionality to functionality in the context of a single navigable window. In the illustrated and described embodiment, the navigation model comprises a navigation stack. Other navigation models can, of course, be used. In step 902, a user takes an action relative to one or more of the functionalities. Here, as was illustrated above, a user's actions can affect different entries in the navigation model depending on the nature of the actions. These actions can affect entries that are displaced many entries away from the user's current location. When these actions impact an entry in the navigation model, the navigation model should be adjusted or otherwise manipulated to ensure that the navigation model always provides the user with a consistent and logically accurate user experience. Accordingly, step 904 ascertains whether a user action has an impact on a navigation model entry. If no entry is impacted by the user's action, then the method returns to step 902 and continues to the next user action. If, on the other hand, step 904 ascertains that the user's action impacts a navigation model entry, then step 906 manipulates one or more of the entries responsive to the user action. Note that this manipulation could be done either by the actions themselves (as shown here, where the actions that manipulate the navigation stack are aware that they need to do so) or by a continuous or conditional monitoring service on the navigation stack. The manipulation of the navigation model can be any manipulation that is directed to maintaining the navigation model's contextual consistency with the user's activities. For example, entries can be removed, added, reorganized, and/or redirected. Further examples of exemplary navigation stack manipulations are given below.

Document Centric Application

In the embodiment described in connection with FIGS. 4 and 5, the functionalities that are available to the user relate to "document-centric" functionalities. Document-centric functionalities include such things as word processing functionalities, email functionalities, planner functionalities and the like—where the underlying object that the user is operating on is a document. Other document-centric functionalities can, of course, be provided and are not to be limited to those shown in the above examples. Such functionalities can include, without limitation, financial management functionalities, travel functionalities, medical functionalities, income tax functionalities, and telephone log functionalities to name just a few. These document-centric functionalities can be defined by the needs of the user and the creativity of third party software designers that can design extensions for the single window application, as will be explored in the section entitled "Extensible Functionalities" below. In the illustrated example, all of the documents are defined or created in HTML, although other mechanisms of defining or creating document can of course be used.

Document Modes

The document-centric functionalities are characterized, in part in the present example, by the different types of documents that can be encountered. For example, there are "free-form"-type documents such as a word processing document, "form"-type documents such as a "personal contact" form in the contacts functionality where the user can insert certain information in certain blocks, and documents that fall somewhere in the middle between free-form and form documents, e.g. an email message where there is a form at the top for the addressee and subject, and an open area underneath for text. In the described embodiment, multiple document modes are provided and essentially constrain the actions that a user can take relative to particular documents. Specifically, in the present example there are two document modes that a document can assume—a browse mode and an edit mode.

The document modes are useful because command sets that are displayed in the command area(s) 304 (FIG. 3) may change drastically depending on whether the user is simply viewing a browse-mode document or authoring an edit-mode document. In the present example, the document that is visible in the display area 306 is always in a particular mode. For example, when a document is in browse mode, the user cannot change the underlying HTML that makes up the document. As an example, consider a case where a user navigates to a web page. The web page is displayed in the display area in a browse mode so that the user cannot change the underlying HTML that makes up the web page. (The page may have text areas and other things that can take user input, though.) When, however, a document is in edit mode, the user can change the content (i.e. HTML) that makes up the document. The amount that can be changed depends on the type of document provided: free-form documents allow more parts of the HTML to be edited than form items, for example. Consider that a user might navigate to their word processing functionality to a document collection and pull up a document. This document might be pulled up in browse mode so that the user can read it. If, however, the user wishes to manipulate the document, they can convert it to edit mode to manipulate the content of the document. To convert a document to edit mode, the user need simply click an "edit" button which then enables the user to edit the document. There is policy that can be defined for when a document should be in edit or browse mode. For example, if the author places a document in edit mode during a session and then navigates to another document without finishing editing activities, then the edit-mode document will be placed in edit mode the next time the author visits the document. In the described embodiment, "new" documents that are created by the user are in edit mode by default. This allows the user to modify the document. In addition, the user can change the mode of a document from edit to browse, e.g. by signifying completion of the document. For example, for a document in the form of an email message, the mode change from edit to browse can be affected by sending the email message. For a document in the form of a contact, the mode change from edit to browse can be affected by saving the contact.

There are some navigation model issues that arise from having different document modes. Consider, for example, a user that navigates the single window to a document that is in browse mode and then converts the document to edit mode. Assume now that the user begins to edit the document but before they are through editing the document, they receive an email message from a friend. Using the navigation function, they click on the mail link to pull up their email box and then click on the new message. At this point, the navigation stack looks like this:

Edit mode document→email box→new message

Assume that when they are finished reading the new message, they wish to return to the document that they were editing. Rather than navigating back through the navigation stack using the "back" button, the user clicks on the "documents" link to pull up the document functionality and then they click on the individual document that they were editing. Because the document of interest was previously in edit mode (as indicated by the navigation stack), when the document is presented to the user in the display area, it is presented in edit mode and not browse mode. Thus, the system is able to maintain the state of the documents that correspond to navigation model entries even when the user navigates to the documents outside of the direct path defined by the navigation stack.

As another navigation model issue, consider the following: Assume that a user navigates to a document using the single window. The document is located on the Web and is specified by a URL "http:// . . . /document1". Assume now that the user converts the document from browse mode to edit mode. When the user does this, the system makes a copy of the document and places it locally on the user's computer. The local copy of the document is now specified by a URL that is different from the URL that enabled the user to access the document on the Web. The navigation stack is accordingly manipulated to modify the Web-based document URL so that the URL is now the local computer URL. Now if the user moves on and navigates the single window to other functionalities, when they return to document1 by going back through the navigation stack, the navigation stack points to the location of the copy that is currently being edited (i.e. the copy that corresponds to the changed URL) and not the Web-based version of the document. In this instance, the navigation stack is manipulated to point to a different location based upon the user's action. Specifically, the navigation stack is manipulated to modify the URL of an associated entry so that the user's context is consistent when they return to the document associated with that entry.

Authoring

In the document-centric example, authors or users can both create new items and edit many existing items. In the illustrated example, the documents are defined in terms of HTML, although other formats can be used to define the documents. Authoring can take place in a freeform or form format. To author a new item, the user simply clicks a "new" button in the command area 304 (FIG. 3). The user can create items of different types from the same control (i.e. new email types, document types, contact types etc.). For example, a "New" button can provide a dropdown menu to allow the user to choose documents of different types. When a user creates a new document type, the navigation window is navigated to a new empty document of the corresponding type and the new item is entered into the navigation stack in edit mode by default. This new document remains in the navigation stack although provision can be made for maintaining links to the document even if it falls out of the navigation stack.

Figure 10:
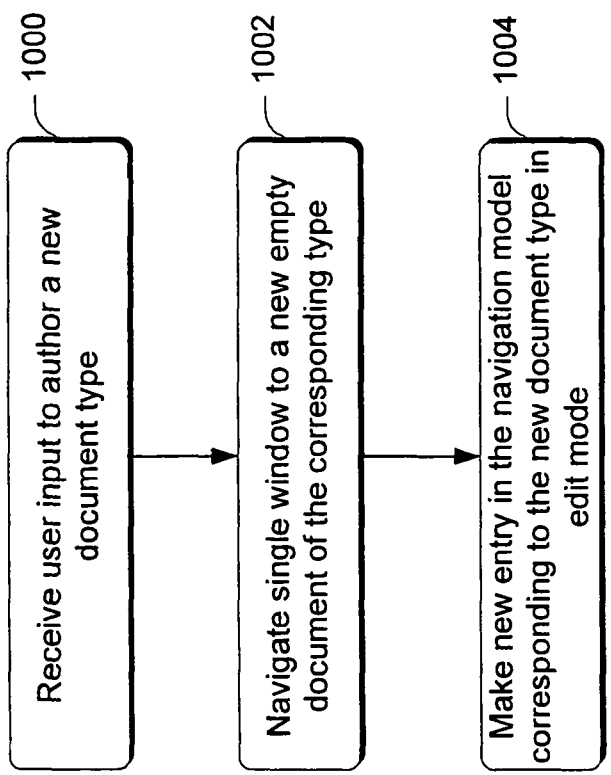
FIG. 10 is a flow diagram that describes steps in a document-centric method in accordance with the described embodiment.

FIG. 10 is a flow diagram that describes steps in a document creation method in accordance with the described embodiment. The method is advantageously implemented in software. Step 1000 receives user input to author a new document type. The document type can be any suitable document type with exemplary document types including, without limitation, documents, email messages, calendar appointments, contacts and the like. Responsive to the user's input, step 1002 navigates the single window to a new empty document of a corresponding type. Thus, if the user specified a freeform document as the document type, the single window would be navigated to a free-form document; if the user specified an email message as the document type, the single window would be navigated to an empty email message form to be filled in by the user. Step 1004 then makes an entry in the navigation model (e.g. the navigation stack) corresponding to the new document type. By default, the new document type is entered in the navigation stack in the edit mode so that the user can author the document.

Authors can also edit existing items, as indicated above. Typically, these items are items that they have worked with before. To edit an existing item, the user navigates their single window to the appropriate document and clicks on the "edit" button to convert the document from browse mode to edit mode. In the described embodiment, the navigation stack is manipulated as follows to accommodate the user's action. When the user navigates to a document of interest, an entry is made in the navigation stack that corresponds to the document in browse mode. After all, it was a browse mode document that the user pulled up. When the user clicks the "edit" button, the browse mode document is converted to an edit mode document in the navigation stack. One way of implementing this action is to perform a quick forward and delete operation. That is, when the document is converted into the edit mode, an edit mode entry for a copy of the browse mode document is made in the navigation stack and then the corresponding navigation stack entry for the browse document is deleted. Accordingly, this is but one more example of how the navigation model can be manipulated in accordance with the user's actions to preserve a consistent user context.

Publishing

When a user has completed a document, they can mark the document as complete by publishing it. Publication of a document means different things for different types of documents. For example, a free-form document might be published to a central server; a contact might be published to the user's own section of the server; an email message is published when it is sent to the recipient. In the described-embodiment, the functionalities in the single navigable window application are programmed so that they make sure the single navigable window understands each of the document types with which it is associated and how to specifically publish each of the documents. Thus a user, when finished working on a particular document, might click a "publish" button whereupon the software automatically knows how to publish the corresponding document. This is just one example of how an item might be published. Accordingly, the user need not know protocols or particular locations where the items are to be published.

Figure 11:
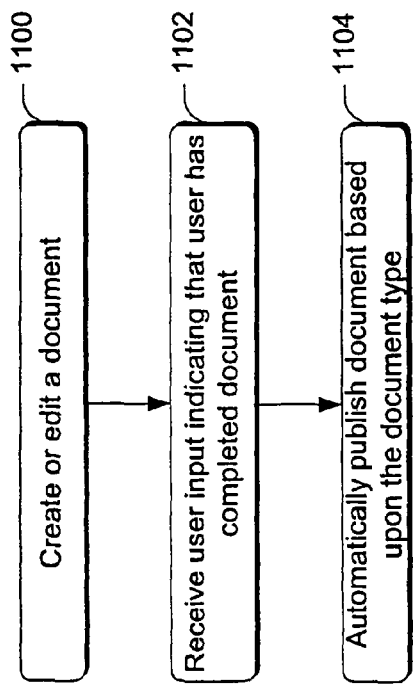
FIG. 11 is a flow diagram that describes steps in a document-centric method in accordance with the described embodiment.

FIG. 11 is a flow diagram that describes a publishing method in accordance with the described embodiment. The described method is advantageously implemented in software. Step 1100 creates or edits a document. This step is implemented by a user interacting with the single navigable window to either create a new document or edit an existing document as described above. Step 1102 receives user input indicating that the user has completed the document. In the described example, this step is implemented responsive to a user clicking on a button such as a "publish" button. Responsive to the user providing this input, step 1104 automatically publishes the document based upon the document type. In this step, the software is programmed so that the publishing routine that is selected is specifically tied to the document type so that a user need not be concerned with any specific protocols or document locations. Rather, the software automatically publishes the document in a manner that is consistent with the document type.

Viewing Collections

In the described embodiment, one of the advantageous features of the single navigable window application is that it can natively create (via the different built in functionalities), understand, and enable viewing of collections of documents of different types. For example, the application can allow the user to view any collection of documents that the user or others might have created based upon various properties of the documents such as document type or document author. To do this, a user simply navigates the single window to a collection of interest (such as the email box of FIG. 5, or a day on the calendar). The collection then appears in the display area 306 (FIG. 3) of the UI. Once the user has navigated to the particular collection, the software allows, in many cases, selection of a particular item (i.e. selection of a particular mail message in the email box) and navigation of the single window to that item. Thus, the selected item is viewed within the same window as was the particular collection. While at the various collections, the user can be presented with various context-sensitive tools to work within that collection. Examples of context-sensitive tools are described in the U.S. Patent Application entitled "Task Sensitive Methods And Systems For Displaying Command Sets" incorporated by reference above.

Accordingly, in this embodiment, the single navigable window application is able to navigate to and permit viewing of collections of different types of documents. This constitutes a noteworthy departure from conventional browser functionality which does not typically allow navigation and/or user interaction with different types of documents.

Extensible Functionalities

In one embodiment, the functionalities that are provided by the single navigable window application are extensible meaning that the functionalities can be added and removed from the application. In this way, third party developers can provide various extensible functions that can be added or integrated into the single application. In this way, a user can add to their existing set of functionalities by simply selecting one or more functionalities of interest and incorporating the functionalities into the application. In addition, system administrators can add to the existing set of functionalities for a group of users by using a similar selection mechanism. These particular extensible functionalities are referred to as "extensions". Exemplary extensions and methods of providing extensions are described in U.S. Patent Application entitled "Network-based Software Extensions", and "Architectures For And Methods Of Providing Network-based Software Extensions" incorporated by reference above.

Generic Single Navigable Window Application Platform

Figure 12:
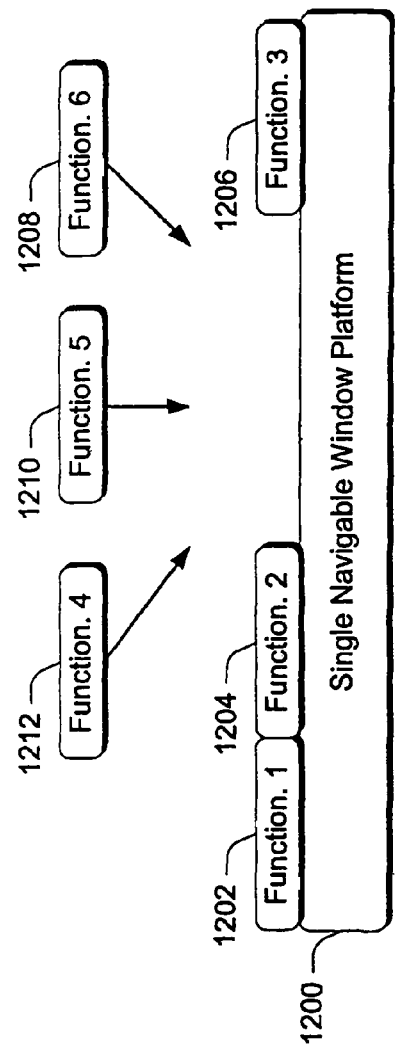
FIG. 12 is a high level block diagram that illustrates concepts in accordance with one embodiment.

One of the advantages of having the extensible functionalities as described above is that now, the single navigable window application can be provided as essentially a shell or software platform upon which these various functionalities can build. Consider for example FIG. 12. There, a single navigable window platform 1200 is shown. Platform 1200, in its most basic form, may have no functionalities whatsoever associated with it. Rather, it may only provide the infrastructure support that implements the single window navigation operability, e.g. software code that provides and manages a navigation model and navigation operations (such as clicking on a link to navigate a window to a particular functionality). In this case, some or all of the functionalities could then be defined by third parties and added to the platform as appropriate. As an example, functionalities 1202, 1204, and 1206 have been added to the platform to impart a degree of functionality to the single navigable window application. These added functionalities might include a word processing functionality, an email functionality, and a calendar functionality. Other functionalities such as functionalities 1208, 1210, and 1212 have not been but could be added.

Delivery of the functionalities or extensions as they have been referred to above, can be in any suitable way. For example, an individual user might physically insert a CD carrying software code for a particular functionality into their computer and load the software. The functionality would then be added to the platform for the user to interact with. Alternately, the functionalities or extensions can be delivered over a network such as the Internet. An example of how this can be done is described in the Application entitled "Network-based Software Extensions", incorporated by reference above.

Subscription Model

In accordance with one embodiment, the single navigable window application and its various functionalities are packaged and provided to consumers as a service to which they can subscribe for a fee. As an example model, consider FIG. 13. There, multiple clients are shown each of which contains a platform such as the one described in connection with FIG. 12. One or more servers are configured to provide various functionalities or extensions for delivery over the Web. The various functionalities or extensions can be provided by independent software vendors and can be written so that they plug directly into the software platform that provides the single navigable window functionality. Mechanisms for plugging software extensions into a software platform will be understood by those of skill in the art and are not described in detail here.

Figure 13:
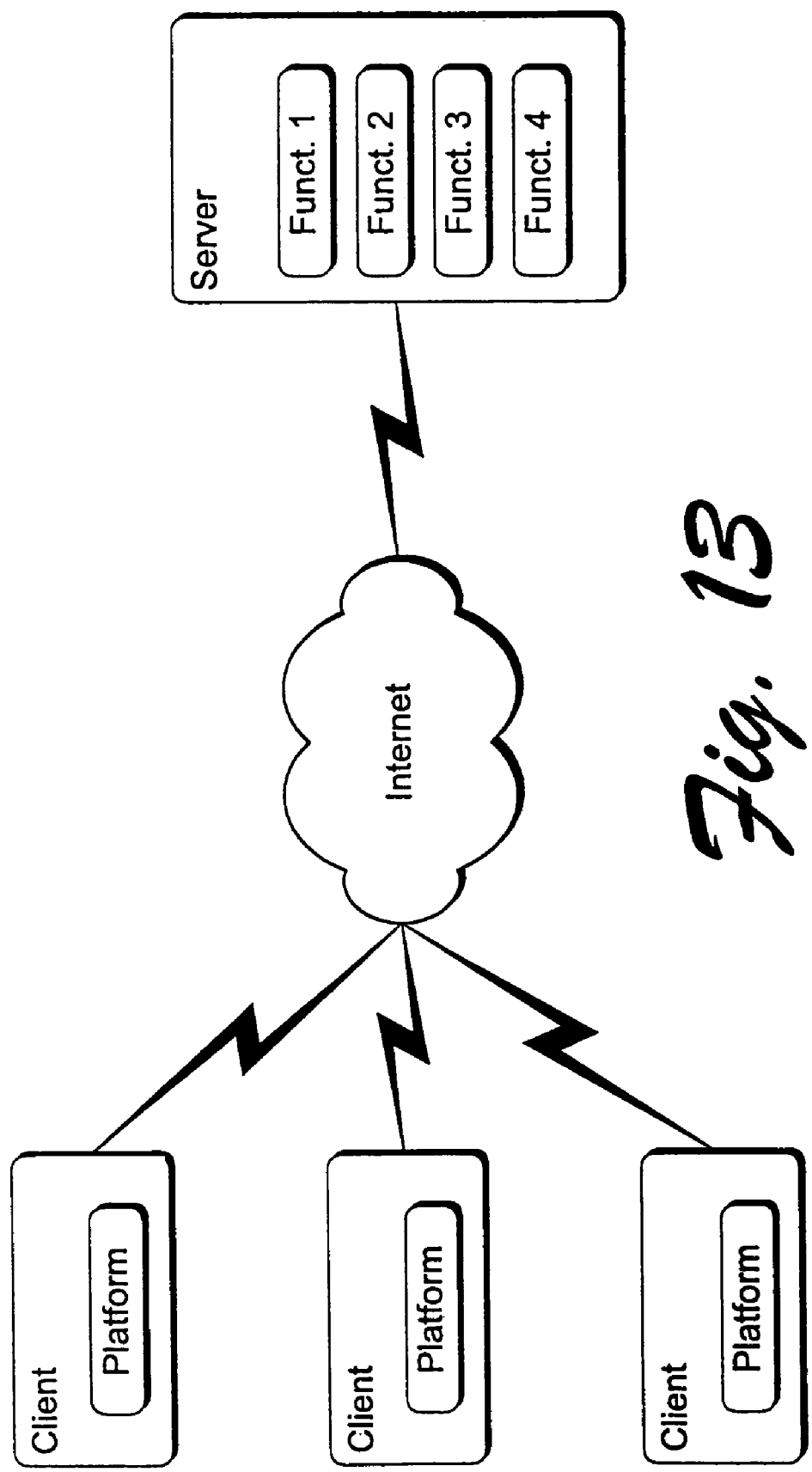
FIG. 13 is a high level block diagram that illustrates concepts in accordance with one embodiment.

As an example, consider the case of a small company that employs a computing system to track inventory and perform various office tasks such as word processing, email, accounting (i.e. payroll) and the like. Today, this company might employ several different software applications that provide all of the functionality that is needed for the organization. With that approach, the information technology costs can be very large, particularly for a small company. In the present model, however, a Web-based service ensures that each customer, e.g. each company, can access the various functionalities they need for a subscription fee. The functionalities are plugged into and integrated into a single navigable window application that greatly facilitates the customer's computing experience. It will be appreciated that, although each illustrated client in FIG. 13 is shown as having a platform to which the functionalities can be added, individual platforms for particular customers might be hosted by a separate server so that a customer need only log into the Web to have all of the subscribed functionalities exposed to them.

CONCLUSION

The embodiments described above provide improved methods and systems for creating and using information in a computing environment. The inventive methods and systems address and provide solutions to user issues relating to computing in a multi-window environment. The described methods and systems provide a single navigable window that can be used by a user to navigate to and between multiple different functionalities that are provided by a single application program. The functionalities enable the user to complete different tasks, and the single window enables the user to navigate between functionalities, and hence tasks, in a seamless manner. By having only one window, the user is relieved of the duties of managing multiple windows. By having all of the functionalities presented within a single application, the user is provided with a highly integrated software product that greatly improves the user's computing experience.

The described novel use of a navigation model that manages the user's navigation activities to and between the different functionalities ensures that the user's navigation experience bears an accurate logical relationship with the user's various activities. The provided navigation instrumentalities enable the user to navigate among the different functionalities in a quick and efficient manner.

In the software platform embodiment, the single application is extensible to receive and incorporate different functionalities that are provided as software modules that can be sent over a network such as the Internet. The extensible software platform provides a basis to offer a subscriber or fee-based service where different subscribers can, for a fee, access different functionalities via a network such as the Internet.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A system comprising:

means for storing application programs;

single application program means on the means for storing, said single application program means providing:

single navigable window means;

multiple different functionalities internal to the single application program to which the single navigable window means can be navigated by a user, the multiple different functionalities including two or more of the following: a web-browser functionality, a planner functionality, an email functionality, a contacts functionality, or a word processing functionality;

navigation means for managing the user's navigation activities within the single application program;

user-clickable means for allowing the user to navigate the single window means inside individual functionalities and to the different functionalities; and at least one context-sensitive command area displayed adjacent to a display of the single navigable window means and associated with the single navigable window means, the at least one context-sensitive command area including at least one specific command for each of the multiple different functionalities and at least one global command, the single application program means automatically changing the at least one specific command but maintaining the at least one global command that are presented to the user within the command area as the user navigates to different functionalities.

2. The system of claim 1, wherein the navigation means comprises a navigation stack.

3. The system of claim 2, wherein the navigation stack comprises a back-and-truncate stack.

4. The system of claim 1, wherein one of the user-clickable means comprises link means associated with each of the multiple different functionalities to which the single navigable window means can be navigated.

5. The system of claim 1, wherein one of the user-clickable means comprises browser-like navigation buttons.

6. The system of claim 1, wherein the user-clickable means comprise:

link means associated with each of the multiple different functionalities to which the single navigable window means can be navigated; and browser-like navigation buttons.

7. The system of claim 1, wherein the multiple different functionalities comprise document-centric functionalities.

8. A system comprising:

means readable by a computer;

software platform means, embodied on the readable means, for providing a single application program that provides:

a single navigable window means;

means for navigating the single navigable window to different functionalities internal to the single application program that can enable a user to accomplish different tasks, the different functionalities including two or more of the following: a web-browser functionality, a planner functionality, an email functionality, a contacts functionality, or a word processing functionality;

means for managing navigation activities of the user;

context-sensitive command set means for presenting command sets as a user's context changes in accordance with the user's navigation activities, the content-sensitive command set means displayed adjacent to a display of the single navigable window means, the context-sensitive command set means configured to display at least one specific command for each of the different functionalities and at least one global command, and the context-sensitive command set means configured to change the at least one specific command but maintain the at least one global command as the user navigates to different functionalities; and means for receiving and incorporating into the single application program individual software components that comprise individual different functionalities.

9. A computing system embodying the system of claim 8.

10. A computing method comprising:

displaying a user interface that comprises:

a single navigable window that can be navigated between multiple different document-centric functionalities that are provided by a single application program, the multiple different document-centric functionalities including two or more of the following: a web-browser functionality, a planner functionality, an email functionality, a contacts functionality, or a word processing functionality;

at least one context-sensitive command area displayed adjacent to a display of the single navigable window and associated with the single navigable window;

receiving user input that indicates selection of a particular functionality;

navigating the single navigable window to the particular selected functionality;

displaying in said window indicia of said functionality that can enable a user to access the particular selected functionality; and displaying in said at least one context-sensitive command area at least one specific command corresponding to the particular selected functionality and at least one global command, wherein the at least one specific command changes as the user navigates to different document-centric functionalities, and wherein the at least one global command is maintained as the user navigates to different document-centric functionalities.

11. The method of claim 10, wherein said displaying the user interface comprises displaying proximate the single navigable window, navigation instrumentalities that are configured to enable to user to input selection of a particular functionality.

12. The method of claim 11, wherein one of the navigation instrumentalities comprises links associated with each of the multiple different functionalities.

13. The method of claim 11, wherein one of the navigation instrumentalities comprises browser-like navigation buttons that can be used by a user to navigate the single navigable window between the different functionalities.

* * * * *